United States Patent
Vagner et al.

(10) Patent No.: US 11,394,510 B2
(45) Date of Patent: Jul. 19, 2022

(54) COLLISION AVOIDANCE AND IMPLICIT LOCATION ENCODING IN VEHICLE-TO-PEDESTRIAN NETWORKS

(71) Applicant: QUALCOMM Incorporated, San Diego, CA (US)

(72) Inventors: Shmuel Vagner, Raanana (IL); Assaf Touboul, Netanya (IL); Gideon Shlomo Kutz, Ramat Hasharon (IL); Shay Landis, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/909,708

(22) Filed: Jun. 23, 2020

(65) Prior Publication Data

US 2020/0412507 A1 Dec. 31, 2020

Related U.S. Application Data

(60) Provisional application No. 62/866,428, filed on Jun. 25, 2019.

(51) Int. Cl.
*H04W 4/021* (2018.01)
*H04L 5/00* (2006.01)
(Continued)

(52) U.S. Cl.
CPC .......... *H04L 5/0053* (2013.01); *H04L 5/0005* (2013.01); *H04W 4/021* (2013.01);
(Continued)

(58) Field of Classification Search
CPC ....... H04W 4/02; H04W 4/025; H04W 4/021; H04W 4/18; H04W 4/70; H04W 64/00;
(Continued)

(56) References Cited

U.S. PATENT DOCUMENTS 10,506,575 B2 * 12/2019 Lei ........................ H04W 72/044
2009/0232084 A1 * 9/2009 Li .......................... H04L 5/0007
370/330

(Continued)

OTHER PUBLICATIONS

Intel Corporation: "Support of Gee-based Transmission Schemes for V2V Communication", 3GPP Draft, 3GPP TSG RAN WG1 Meeting #84, R1-160431—INTEL—V2V GEOTX, 3rd Generation Partnership Project (3GPP), Mobile Competence Centre, 650, Route Des Lucioles, F-06921, Sophia-Antipolis Cedex, France, vol. RAN WG1, No. St Julians, Malta, Feb. 15, 2016-Feb. 19, 2016, Feb. 14, 2016 (Feb. 14, 2016), XP051053768, 9 pages, Retrieved from the Internet: URL: http://www.3gpp.org/ftp/Meetings_3GPP_SYNC/RAN1/Docs/—[retrieved on Feb. 14, 2016] paragraphs [0001]-[0003], [0005].

(Continued)

*Primary Examiner* — Jean A Gelin
(74) *Attorney, Agent, or Firm* — Holland & Hart LLP

(57) ABSTRACT

Methods, systems, and devices for wireless communications are described. A transmitting device may identify location data associated with a physical location of the transmitting device. The transmitting device may identify a time-frequency resource within a slot, the time-frequency resource corresponding to at least a portion of the location data associated with the physical location of the transmitting device. The transmitting device may generate a sequence based at least in part on the portion of the location data, or the slot, or the time-frequency resource, or a combination thereof. The transmitting device may encode a signal using the sequence. The transmitting device may transmit the signal using the identified time-frequency resource to indicate the physical location of the transmitting device.

32 Claims, 13 Drawing Sheets

(51) Int. Cl.
*H04W 4/02* (2018.01)
*H04W 72/04* (2009.01)

(52) U.S. Cl.
CPC ......... *H04W 4/025* (2013.01); *H04W 72/042* (2013.01); *H04W 72/0446* (2013.01)

(58) Field of Classification Search
CPC ............ H04W 72/0446; H04W 72/042; H04L 5/0053; H04L 5/0005
See application file for complete search history.

(56) References Cited

U.S. PATENT DOCUMENTS

| | | | | |
|---|---|---|---|---|
| 2012/0295576 | A1* | 11/2012 | Peterson | G08G 1/205 455/404.2 |
| 2013/0143590 | A1* | 6/2013 | Sridhara | G01S 5/021 455/456.1 |
| 2013/0156190 | A1* | 6/2013 | Selen | H04L 63/0428 380/270 |
| 2015/0009910 | A1* | 1/2015 | Ryu | H04W 72/04 370/329 |
| 2016/0183276 | A1* | 6/2016 | Marinier | H04W 72/12 370/329 |
| 2017/0041916 | A1* | 2/2017 | Soret | H04W 8/005 |
| 2017/0079084 | A1* | 3/2017 | Matsumoto | H04W 92/18 |
| 2017/0142741 | A1* | 5/2017 | Kaur | H04W 76/19 |
| 2017/0332192 | A1* | 11/2017 | Edge | H04W 4/029 |
| 2019/0059071 | A1 | 2/2019 | Khoryaev et al. | |
| 2019/0075559 | A1* | 3/2019 | Chen | H04W 72/048 |
| 2019/0123848 | A1* | 4/2019 | Feng | H04L 1/1812 |
| 2019/0357269 | A1* | 11/2019 | Wu | H04W 72/1284 |
| 2020/0100300 | A1* | 3/2020 | Xie | H04W 76/11 |
| 2020/0120458 | A1* | 4/2020 | Aldana | H04W 72/048 |
| 2020/0136707 | A1* | 4/2020 | Ramachandra | H04W 72/046 |
| 2020/0244412 | A1* | 7/2020 | Kalhan | H04W 72/048 |
| 2020/0296762 | A1* | 9/2020 | Sun | H04B 7/0695 |
| 2020/0328776 | A1* | 10/2020 | Scholand | H04B 1/715 |

OTHER PUBLICATIONS

International Search Report and Written Opinion—PCT/US2020/039453—ISA/EPO—dated Sep. 17, 2020 (193078WO).

\* cited by examiner

CV2X Slot
305

CV2X Slot Mapped to
Location Area

Location Area
310

COLLISION AVOIDANCE AND IMPLICIT LOCATION ENCODING IN VEHICLE-TO-PEDESTRIAN NETWORKS

CROSS REFERENCE

The present application for Patent claims the benefit of U.S. Provisional Patent Application No. 62/866,428 by VAGNER et al., entitled "COLLISION AVOIDANCE AND IMPLICIT LOCATION ENCODING IN VEHICLE-TO-PEDESTRIAN NETWORKS," filed Jun. 25, 2019, assigned to the assignee hereof, and expressly incorporated by reference herein.

BACKGROUND

The following relates generally to wireless communications, and more specifically to collision avoidance and implicit location encoding in vehicle-to-pedestrian (V2P) networks.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Wireless communication systems may include or support networks used for vehicle based communications, also referred to as vehicle-to-everything (V2X) networks, vehicle-to-vehicle (V2V) networks, cellular V2X (CV2X) networks, or other similar networks. Vehicle based communication networks may provide always on telematics where UEs, e.g., vehicle UEs (v-UEs), communicate directly to the network (V2N), to pedestrian UEs (V2P), to infrastructure devices (V2I), and to other v-UEs (e.g., via the network and/or directly). The vehicle based communication networks may support a safe, always-connected driving experience by providing intelligent connectivity where traffic signal/timing, real-time traffic and routing, safety alerts to pedestrians/bicyclist, collision avoidance information, etc., are exchanged. In some examples, communications in vehicle based networks may include safety message transmissions (e.g., basic safety message (BSM) transmissions, traffic information message (TIM), etc.).

SUMMARY

The described techniques relate to improved methods, systems, devices, and apparatuses that support collision avoidance and implicit location encoding in vehicle-to-pedestrian (V2P) networks. Generally, the described techniques provide for mapping between a cellular vehicle-to-everything (CV2X) slot to a physical location grid. That is, aspects of the described techniques exploit the fact that the V2P device is aware of its physical location (e.g., based on an integrated Global positioning system (GPS) receiver) and uses this information to select a particular time-frequency resource within a CV2X slot to implicitly signal its location. For example, a transmitting device (e.g., a V2P device) may identify or otherwise determine location data (e.g., coordinates) corresponding to the physical location of the transmitting device. The transmitting device may then identify time-frequency resources within a slot that correspond, at least in some aspects, to the location data. The transmitting device may generate a sequence using the location data (or at least a portion of the location data), the slot, and/or the time-frequency resource. The transmitting device may use the sequence to encode a signal (e.g., one bit) and transmit the encoded signal using the time-frequency resource within the slot to indicate the physical location of the transmitting device. That is, at least a portion of the location data of the transmitting device may be used to generate the sequence encoding the signal to implicitly indicate the physical location of the transmitting device.

The receiving device (e.g., which may be another V2P device, a user equipment (UE), base station, network device, or any other device operating within a CV2X network) may use the sequence to identify or otherwise determine the physical location of the transmitting device. For example, the receiving device may receive the signal that was encoded using the sequence and transmitted over the time-frequency resource within the slot. The receiving device may attempt to decode the signal using a set of available sequences, with each sequence in the set of available sequences being associated with a time-frequency resource and/or the slot. The receiving device may identify the sequence used to encode the signal by successfully decoding the signal and then determine the physical location of the transmitting device using the sequence, the slot, and/or the time-frequency resource. Accordingly, the receiving device may determine the location(s) of transmitting device(s) (e.g., V2P device(s)) implicitly, and without each transmitting device having to encode and transmit its full location data (e.g., full coordinates set).

A method of wireless communication at a transmitting device is described. The method may include identifying location data associated with a physical location of the transmitting device, identifying a time-frequency resource within a slot, the time-frequency resource corresponding to at least a portion of the location data associated with the physical location of the transmitting device, generating a sequence based on the portion of the location data, or the slot, or the time-frequency resource, or a combination thereof, encoding a signal using the sequence, and transmitting the signal using the identified time-frequency resource to indicate the physical location of the transmitting device.

An apparatus for wireless communication at a transmitting device is described. The apparatus may include a processor, memory coupled with the processor, and instructions stored in the memory. The instructions may be executable by the processor to cause the apparatus to identify location data associated with a physical location of the transmitting device, identify a time-frequency resource within a slot, the time-frequency resource corresponding to at least a portion of the location data associated with the physical location of the transmitting device, generate a sequence based on the portion of the location data, or the slot, or the time-frequency resource, or a combination thereof, encode a signal using the sequence, and transmit the signal using the identified time-frequency resource to indicate the physical location of the transmitting device.

Another apparatus for wireless communication at a transmitting device is described. The apparatus may include means for identifying location data associated with a physical location of the transmitting device, identifying a time-frequency resource within a slot, the time-frequency resource corresponding to at least a portion of the location data associated with the physical location of the transmitting device, generating a sequence based on the portion of the location data, or the slot, or the time-frequency resource, or a combination thereof, encoding a signal using the sequence, and transmitting the signal using the identified time-frequency resource to indicate the physical location of the transmitting device.

A non-transitory computer-readable medium storing code for wireless communication at a transmitting device is described. The code may include instructions executable by a processor to identify location data associated with a physical location of the transmitting device, identify a time-frequency resource within a slot, the time-frequency resource corresponding to at least a portion of the location data associated with the physical location of the transmitting device, generate a sequence based on the portion of the location data, or the slot, or the time-frequency resource, or a combination thereof, encode a signal using the sequence, and transmit the signal using the identified time-frequency resource to indicate the physical location of the transmitting device.

Some examples of the method, apparatuses, and non-transitory computer-readable medium described herein may further include operations, features, means, or instructions for determining that the physical location of the transmitting device lies within a location area of a set of available location areas, where the sequence may be based on the location area.

In some examples of the method, apparatuses, and non-transitory computer-readable medium described herein, each location area within the set of available location areas includes a grid of geographic areas, each geographic area corresponding to a time-frequency resource.

In some examples of the method, apparatuses, and non-transitory computer-readable medium described herein, the location data may include operations, features, means, or instructions for retrieving information identifying the coordinates from a GPS of the transmitting device.

In some examples of the method, apparatuses, and non-transitory computer-readable medium described herein, the location data may include operations, features, means, or instructions for identifying the least significant bits (LSBs) of the coordinates, where the portion of the location data includes the LSBs.

A method of wireless communication at a receiving device is described. The method may include receiving a signal from a transmitting device over a time-frequency resource within a slot, attempting to decode the signal using a set of available sequences, each sequence in the set of available sequences associated with the time-frequency resource and the slot, identifying a sequence from the set of available sequences based on successfully decoding the signal using the sequence, and determining a physical location of the transmitting device based on the time-frequency resource, or the slot, or the sequence, or a combination thereof.

An apparatus for wireless communication at a receiving device is described. The apparatus may include a processor, memory coupled with the processor, and instructions stored in the memory. The instructions may be executable by the processor to cause the apparatus to receive a signal from a transmitting device over a time-frequency resource within a slot, attempt to decode the signal using a set of available sequences, each sequence in the set of available sequences associated with the time-frequency resource and the slot, identify a sequence from the set of available sequences based on successfully decoding the signal using the sequence, and determine a physical location of the transmitting device based on the time-frequency resource, or the slot, or the sequence, or a combination thereof.

Another apparatus for wireless communication at a receiving device is described. The apparatus may include means for receiving a signal from a transmitting device over a time-frequency resource within a slot, attempting to decode the signal using a set of available sequences, each sequence in the set of available sequences associated with the time-frequency resource and the slot, identifying a sequence from the set of available sequences based on successfully decoding the signal using the sequence, and determining a physical location of the transmitting device based on the time-frequency resource, or the slot, or the sequence, or a combination thereof.

A non-transitory computer-readable medium storing code for wireless communication at a receiving device is described. The code may include instructions executable by a processor to receive a signal from a transmitting device over a time-frequency resource within a slot, attempt to decode the signal using a set of available sequences, each sequence in the set of available sequences associated with the time-frequency resource and the slot, identify a sequence from the set of available sequences based on successfully decoding the signal using the sequence, and determine a physical location of the transmitting device based on the time-frequency resource, or the slot, or the sequence, or a combination thereof.

Some examples of the method, apparatuses, and non-transitory computer-readable medium described herein may further include operations, features, means, or instructions for determining that the physical location of the transmitting device lies within a location area of a set of available location areas, where the sequence may be based on the location area.

In some examples of the method, apparatuses, and non-transitory computer-readable medium described herein, each location area within the set of available location areas includes a grid of geographic areas, each geographic area corresponding to a time-frequency resource.

In some examples of the method, apparatuses, and non-transitory computer-readable medium described herein, determining the physical location of the transmitting device may include operations, features, means, or instructions for identifying, based on the sequence, at least a portion of coordinates associated with the physical location of the transmitting device.

Some examples of the method, apparatuses, and non-transitory computer-readable medium described herein may further include operations, features, means, or instructions for identifying LSBs of the coordinates based on the time-frequency resource, where the portion of the coordinates includes the LSBs of the coordinates.

DETAILED DESCRIPTION

Figure 1:
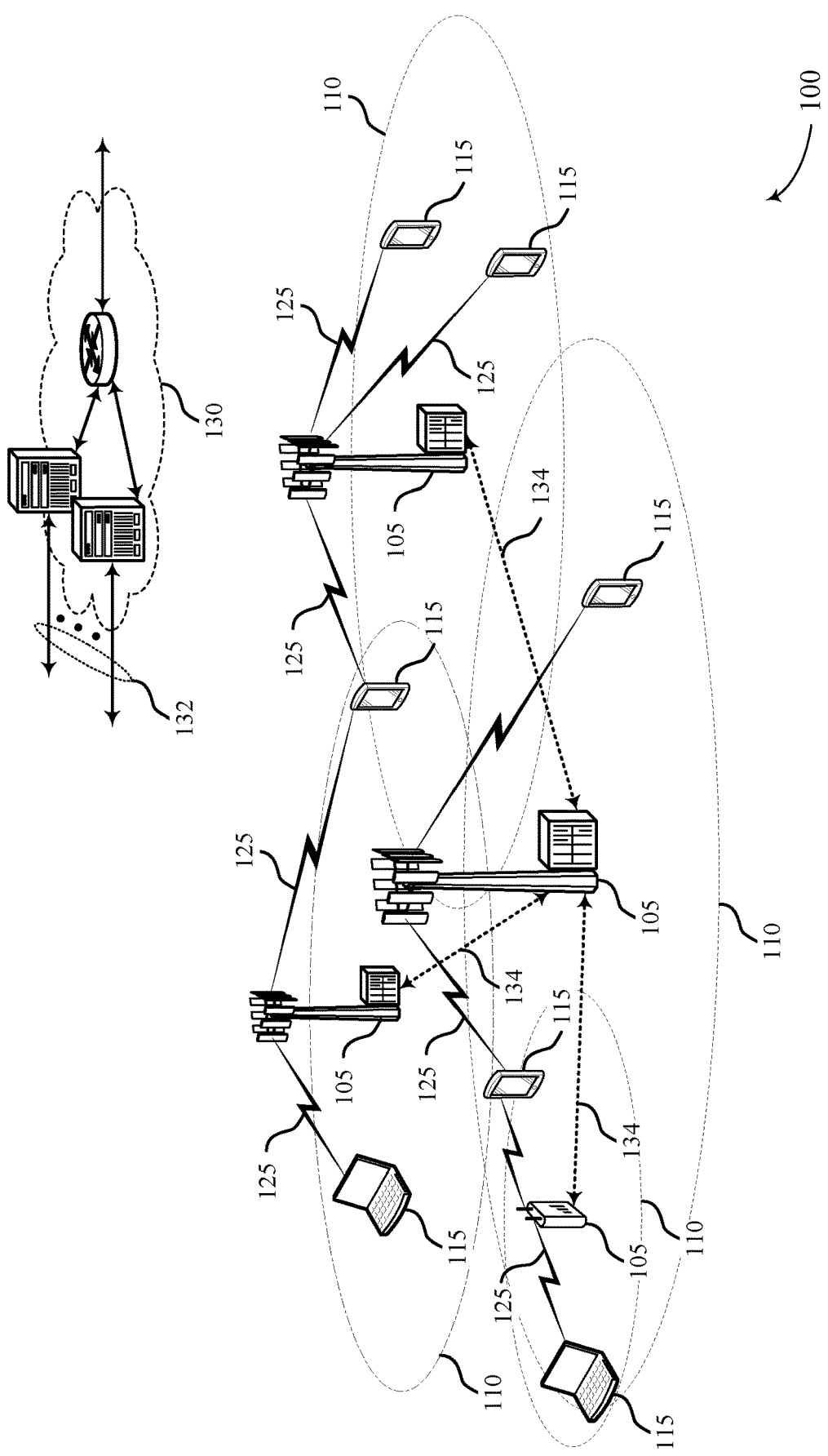
FIG. 1 illustrates an example of a system for wireless communications that supports collision avoidance and implicit location encoding in vehicle-to-pedestrian (V2P) networks in accordance with aspects of the present disclosure.

A wireless multiple-access communications system may include a number of base stations or network access nodes, each simultaneously supporting communication for multiple communication devices, which may be otherwise known as user equipment (UE). Some wireless networks may support vehicle based communications, such as vehicle-to-everything (V2X) networks, vehicle-to-vehicle (V2V) networks, cellular V2X (CV2X) networks, or other similar networks. Vehicle based communication networks may provide always on telematics where UEs, e.g., vehicle UEs (v-UEs), communicate directly to the network (V2N), to pedestrian UEs (V2P), to infrastructure devices (V2I), and to other v-UEs (e.g., via the network and/or directly). Communications within a vehicle based network may be performed using signals communicated over sidelink channels, such as a physical sidelink control channel (PSCCH) and/or a physical sidelink shared channel (PSSCH). In some aspects, communications within a CV2X network may be performed between UEs over a PC5 interface, which may include such sidelink channels.

Aspects of the disclosure are initially described in the context of a wireless communications system, such as a CV2X network including V2P devices. Broadly, aspects of the described techniques provide various mechanisms by which a transmitting device (e.g., the V2P device within a CV2X network) encodes a signal for transmission using a sequence that is based, at least in some aspects, on the physical location of the transmitting device. That is, a geographic area may be mapped, at least to some degree, to a CV2X slot such that transmissions encoded using a sequence implicitly carries or otherwise conveys an indication of the physical location of the device transmitting the signal. For example, a transmitting device (e.g., any V2P device within a CV2X network) may generally determine or otherwise identify location data corresponding to, or otherwise associated with, the physical location of the transmitting device. The transmitting device may determine or otherwise identify a time-frequency resource within a slot that corresponds, at least to some degree, with the physical location of the transmitting device. The transmitting device may use the location data (or at least a portion thereof), the slot, and/or the time frequency resource to generate a sequence used to encode a signal for transmission over the time-frequency resource. The signal (e.g., one or two bits) encoded with the sequence and transmitted within the CV2X network implicitly indicates the physical location of the transmitting device.

The receiving device (e.g., a user equipment (UE), base station, network device/function, or any other device operating within the CV2X network) may use the sequence used to encode the signal to determine the physical location of the transmitting device. For example, the receiving device may receive the signal over the time-frequency resource within the slot and use a set of available sequences to attempt to decode the signal. The receiving device may determine or otherwise identify the sequence that the transmitting device used to encode the signal based on a successful decoding attempt of the signal. That is, the receiving device may attempt to decode the signal using the sequences in the set of available sequences and identify the sequence used by the transmitting device when the decoding attempt is successful with that sequence. The receiving device may then determine or otherwise identify the physical location of the transmitting device using the sequence, the time-frequency resource, and/or the slot in which the signal was received in.

Aspects of the disclosure are further illustrated by and described with reference to apparatus diagrams, system diagrams, and flowcharts that relate to collision avoidance and implicit location encoding in V2P networks.

FIG. 1 illustrates an example of a wireless communications system 100 that supports collision avoidance and implicit location encoding in V2P networks in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transpo in rt channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $Ts=1/30,720,000$ seconds. Time intervals of a communications resource may be organized according to radio frames each having a duration of 10 milliseconds (ms), where the frame period may be expressed as $Tf=307,200$ Ts. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A transmitting device (which may be an example of a UE 115, a V2P device, or any device operating within a CV2X network) may identify location data associated with a physical location of the transmitting device. The transmitting device may identify a time-frequency resource within a slot, the time-frequency resource corresponding to at least a portion of the location data associated with the physical location of the transmitting device. The transmitting device may generate a sequence based at least in part on the portion of the location data, or the slot, or the time-frequency resource, or a combination thereof. The transmitting device may encode a signal using the sequence. The transmitting device may transmit the signal using the identified time-frequency resource to indicate the physical location of the transmitting device.

A receiving device (which may be an example of a UE 115, a V2V device, a V2I device, a base station 105, a network device within core network 130, or any other device operating within a CV2X network) may receive a signal from a transmitting device over a time-frequency resource within a slot. The receiving device may attempt to decode the signal using a set of available sequences, each sequence in the set of available sequences associated with the time-frequency resource and the slot. The receiving device may identify a sequence from the set of available sequences based at least in part on successfully decoding the signal using the sequence. The receiving device may determine a physical location of the transmitting device based at least in part on the time-frequency resource, or the slot, or the sequence, or a combination thereof.

Figure 2:
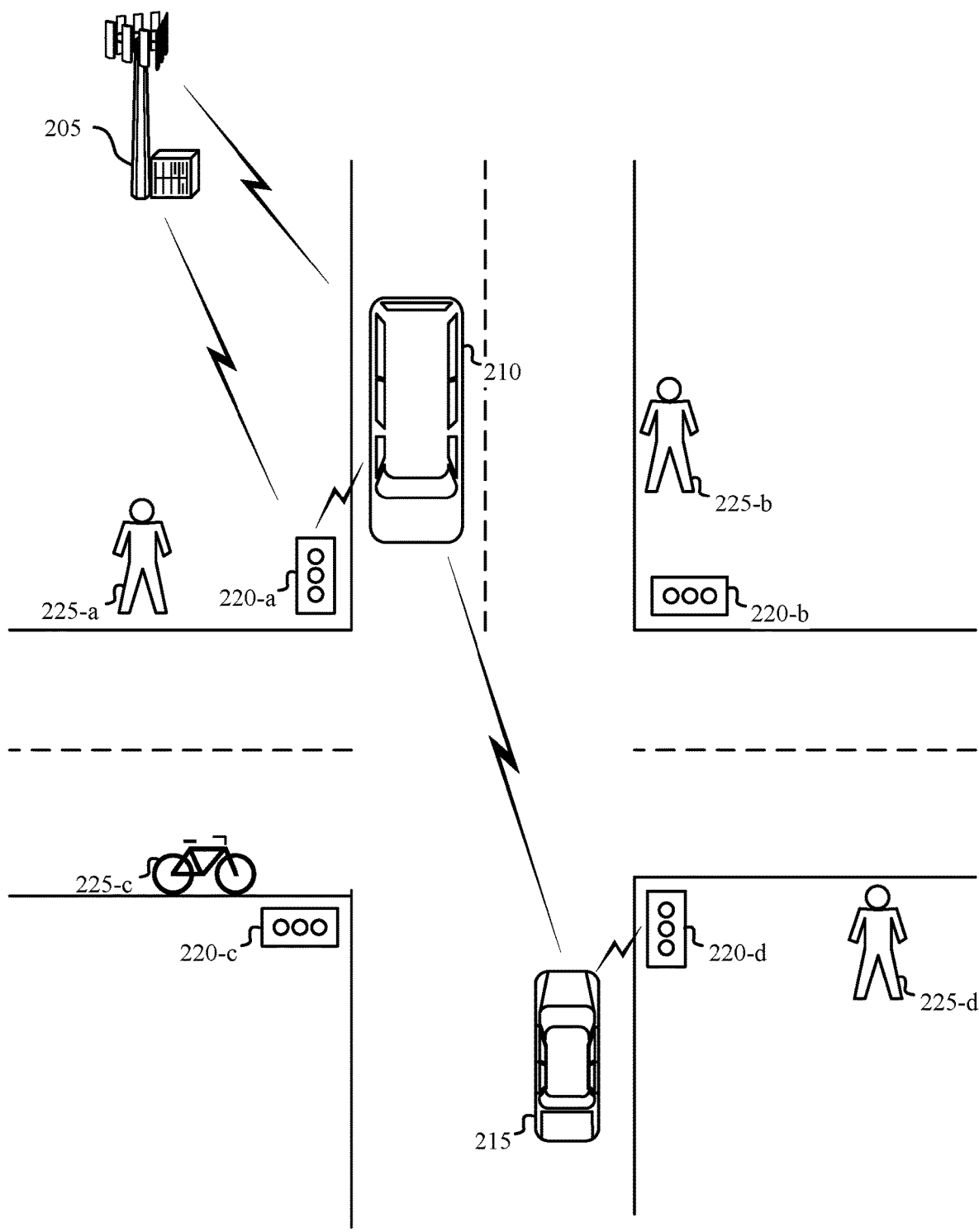
FIG. 2 illustrates an example of a wireless communication system that supports collision avoidance and implicit location encoding in V2P networks in accordance with aspects of the present disclosure.

FIG. 2 illustrates an example of a wireless communication system 200 that supports collision avoidance and implicit location encoding in V2P networks in accordance with aspects of the present disclosure. In some examples, wireless communication system 200 may implement aspects of wireless communication system 100. Aspects of wireless communication system 200 may be implemented by base station 205, vehicles 210, 215, traffic lights 220, and/or V2P devices 225. In some aspects, one or more of the traffic lights 220 may be examples of roadside units (RSUs) communicating in wireless communication system 200, although it is to be understood that other types of devices may be considered RSUs, vulnerable road users (VRUs), etc., within a CV2X network.

In some aspects, wireless communication system 200 may support vehicle safety and operational management, such as a CV2X network. Accordingly, one or more of the vehicles 210/215, traffic lights 220, and/or V2P devices 225 may be considered as UEs within the context of the CV2X network. For example, one or more of the vehicles 210/215, traffic lights 220, and/or V2P devices 225 may be equipped or otherwise configured to operate as a UE performing wireless communications over the CV2X network. In some aspects, the CV2X communications may be performed directly between base station 205 and one or more of the vehicles 210/215, traffic lights 220, and/or V2P devices 225, or indirectly via one or more hops. For example, vehicle 215 may communicate with base station 205 via one hop through vehicle 210, traffic light 220-d, or any other number/configuration of hop(s). In some aspects, the CV2X communications may include communicating control signals (e.g., one or more PSCCH signals) and/or data signals (e.g., one or more PSSCH signals). In some aspects, such sidelink communications may be performed over a PC5 interface between the nodes within wireless communication system 200.

In some aspects, the CV2X network may include different types of nodes communicating over the network. For example, in some aspects the vehicles 210 and 215 may be considered UEs within the CV2X network and traffic lights 220-a, 220-b, 220-c, and/or 220-d may be considered RSUs. V2P devices 225-a, 225-b, 225-c, and/or 225-d may be any wireless device operating within a CV2X network, and may be examples of VRUs. That is, V2P devices 225 may be examples of pedestrians, cyclists, powered two-wheeler devices, etc. More particularly, V2P devices 225 may be examples of a UE carried by, and/or an IOE/IOT device worn by, a pedestrian, an IOE/IOT device mounted into a wearable device, bicycle, skateboard, self-balancing device, etc., and the like.

Generally, some nodes (e.g., RSUs, V2V devices, etc.) may be configured differently from other types of nodes (e.g., UEs, V2P devices, etc.) within the CV2X network. For example, some RSUs may have more available transmission power, e.g., due to being connected to a steady power supply instead of a battery. Other nodes (e.g., V2P devices 225) may be equipped with minimal available battery power, lower communications capabilities/requirements, etc.

Moreover, unlike in other wireless networks, a CV2X network may be configured without a central node responsible for scheduling the transmissions within its network. Instead, all CV2X devices may be independent and negotiate their access to a wireless medium by sensing the channel and selecting transmission opportunities based on the channel busyness. The lack of a centralized scheduler may mean that V2X devices may receive transmissions at any time period. This, and the safety sensitive nature of CV2X communications, may mean that CV2X devices may be forced to constantly operate in a receive or listening mode and may not go into a power saving mode. This may not be an issue for some devices (e.g., V2V devices, V2I devices, etc.) as these devices are connected to a centralized power grid or the vehicles power supply. However, this may be problematic if the device is configured with a smaller amount of available battery power, such as V2P devices 225, for example.

Furthermore, one aspect of V2P communications is for the pedestrian's device to be able to accurately signal its location to nearby vehicles, for example. This creates factors regarding power savings and/or device complexity that must be considered. For example, V2P devices 225, e.g., small devices carried and/or worn by pedestrians, are generally battery-powered devices and, as such, cannot afford to constantly be in a listening mode as this will quickly drain the battery. This may prevent V2P devices 225 from creating and maintaining a fresh channel occupancy map, which may lead to transmission collisions and/or degraded signal reception by nearby vehicles or other CV2X devices operating on the network. Moreover, V2P devices 225 may also be cost sensitive in nature and, therefore, adding additional hardware/functionality may be undesired.

Accordingly, aspects of the described techniques provide a concept that simplifies the V2P device 225 by eliminating the need to constantly act as a receiver (e.g., to constantly be in a listening mode to maintain an active channel occupancy map). The described techniques may be used to achieve considerable savings in material cost for the chip itself (e.g., the modem area may typically be dominated by receiver logic) as well as for auxiliary components, such as radio frequency chains, low noise amplifiers, synthesizers, antennas, etc. The described techniques exploit the fact that the pedestrian device (e.g., V2P devices 225) is aware of its physical location (e.g., contains a GPS receiver) and, therefore, can use this information to uniquely select time-frequency resources on a channel grid. That is, each CV2X slot may consist of 100 resource blocks across 14 symbols (out of which 13 symbols are usable). In some aspects, 10 resource blocks may consist of 120 sub carriers. A typical GPS accuracy may be three meters. Accordingly, this may support a direct mapping of a 30×39 meter grid to a CV2X slot by using the location data associated with the physical location of the transmitting device (e.g., by using the least significant bits (LSBs) of the GPS coordinates).

In one non-limiting example, aspects of the described techniques may include dividing a 3 m by 3 m physical location into a location unit (LU). Time-frequency resources within a CV2X slot may then be divided into a location resource (RS), e.g., one RS consists of one symbol by 10 resource blocks. A location area (LA) may consist of a 10 by 13 grid of LUs and one CV2X slot that is mapped to one LA may be considered a location slot (LS). A location region (RR) may correspond to a physical area covered by a LS. In this example, a single LU may include (e.g., is mapped to) 10×12=120 resource elements capable of holding a sequence of 120 complex in-phase/quadrature (I/Q) elements. By using multiple orthogonal sequences, a single LS can further represent multiple LAs by assigning different orthogonal sequences to different LAs (e.g., based on non-LSB bits of the coordinates). This means that by using 64 different orthogonal sequences, a single LS can be mapped to an area of size approximately 240 m×312 m. Outside of a particular RR, sequences and resources can be re-used and the receiver can discard distant sequences by setting a threshold level for the receive signal strength.

In terms of channel occupancy, given a maximum pedestrian (including bicycle) speed of 36 km/h, a 3×3 m grid will be crossed within in about 300 ms. This means that in this example where a single CV2X slot of 0.5 ms is used, the medium usage for conveying pedestrian location signals to vehicles 210/215 may be 1/600=0.166%. Spectral efficiency vs. detection probability trade-offs can be made by tuning the size of an RS, the number of orthogonal sequences, the number of CV2X slots dedicated for V2P, etc.

Accordingly, the devices of wireless communication system 200 may each be configured such that some of the CV2X slots are dedicated or otherwise allocated to V2P traffic (e.g., every Nth CV2X slot, where N is a positive integer). This information may be configured by a network device (e.g., by or via base station 205) during initial connection establishment and/or updated as needed using, for example, higher layer signaling, e.g., using RRC signaling, a MAC control element (CE), IP-based signaling, etc. Accordingly, each device operating within wireless communication system 200 (e.g., a CV2X network) may know which slots are dedicated for V2P communications and/or may know which time-frequency resource within a particular slot and for a given physical location correspond to a particular sequence.

Accordingly, any one of the V2P devices 225 may be a transmitting device within the context of the described techniques. Initially, each V2P device 225 may wake up periodically (e.g., every CV2X slot allocated for V2P device location reporting, such as every 300 ms) and use its internal GPS to determine its location coordinates (e.g., location data). Each V2P device 225 may identify the location data associated with its physical location (e.g., may identify the coordinates retrieved from a GPS receiver of the V2P device 225). The V2P device 225 may then identify a time-frequency resource within the slot (e.g., within the CV2X slot) based, at least in some aspects, on a portion of the location data associated with physical location of the V2P device 225 (e.g., based on the LSBs of the coordinates).

In some aspects, this may include translating the coordinates (from most significant bit (MSB) to LSB) to slot number, sequence number, and time-frequency resource within the slot. For example, the V2P device may select a time-frequency resource that is based on the portion of the location data (e.g., the LSBs of the coordinates), generate a sequence that is based on another portion of the location data (e.g., other bits in the coordinates), and select a slot that is based on yet another portion of the data (e.g., other bits of the coordinates). Accordingly, any specific location within a defined geographic area will correspond to exactly one time-frequency resource within a particular CV2X slot (e.g., one RS) that matches one LU and will be encoded by exactly one orthogonal sequence. As discussed, using orthogonal sequences enable mapping of adjacent physical areas (e.g., LA) to the same slot. This increased the area that can be covered by a single slot and allows devices that are separated by a threshold amount of distance to be able to reuse a sequence number without confusion or collision by a receiving device.

That is, a single LU (a 3 m×3 m area within the global GPS grid) may be represented by a combination of: a time-frequency resource, an orthogonal sequence, a slot. A grid of adjacent LUs (e.g., an LA) is represented by a combination of: an orthogonal sequence, and a slot. This means that all LUs within an LA may be mapped to different time-frequency resources, but to the same sequence and same slot number. A super-grid of adjacent LAs (e.g., an RR) may be represented by a slot only. Accordingly, time-frequency resources may be used to differentiate between physical locations that are close-by (e.g., within a defined range). Sequences may be used to differentiate between physical locations that are farther apart and slots are used to differentiate between locations that are even further farther apart.

The V2P device 225 may then encode a signal (e.g., one bit) using the sequence corresponding to the portion of the location transmitting device, the slot, and of the time-frequency resource, and transmit the encoded signal using the time-frequency resource. This may carry or otherwise convey an indication of the physical location of the transmitting device (e.g., of the V2P device 225 transmitting the encoded signal). That is, V2P device 225 may transmit the selected sequence over the selected slot using the selected time-frequency resource to implicitly transmit an indication of its physical location.

A receiving device (e.g., vehicles 210/215, traffic lights 220, base station 205, etc.) may receive the signal from the transmitting device over a particular time-frequency resource and within a particular CV2X slot. The receiving device may attempt to correlate the signal using a set of available sequences, with each sequence in the set of available sequences associated with a respective location area covered by the slot. The receiving device may attempt to correlate the signal using each sequence in the set of available sequences until the correlation attempt is successful. The receiving device may identify the sequence from the set of available sequences based on the successful correlation of the signal using the sequence. The receiving device may determine the physical location of the transmitting device based on the time-frequency resource, the slot, and/or the sequence.

That is, the receiving device may determine whether any given slot is allocated for V2P location reporting (e.g., is a LS). If not, the receiving device may continue with normal V2X operations. If so, the receiving device may cross correlate each RS within the slot to each of the possible sequences. When a match is found (e.g., a correlation threshold passes), the receiving device may translate the slot number, the sequence number, and/or the time-frequency resource location to GPS coordinates (e.g., an LU) and mark that spot as being occupied by a pedestrian (e.g., V2P device 225).

This approach may provide numerous advantages for the devices operating within wireless communication system 200. One example may include the power efficiency of the pedestrian V2P devices 225 by eliminating the need for constant spectral monitoring and by not requiring any bi-directional signaling between the V2P devices 225 and vehicles 210/215. Additionally, this approach may reduce the buildout material cost of the V2P devices 225 by eliminating (in some cases) or reducing the receiver's capabilities/complexity. Moreover, this may improve the reliability of reception on the vehicle side by eliminating transmitter collisions and therefore minimizing in-band interference. In some aspects, the described techniques may improve resource collision avoidance in the distributed system by implicit mapping of the wireless spectrum to physical GPS coordinates.

Figure 3:
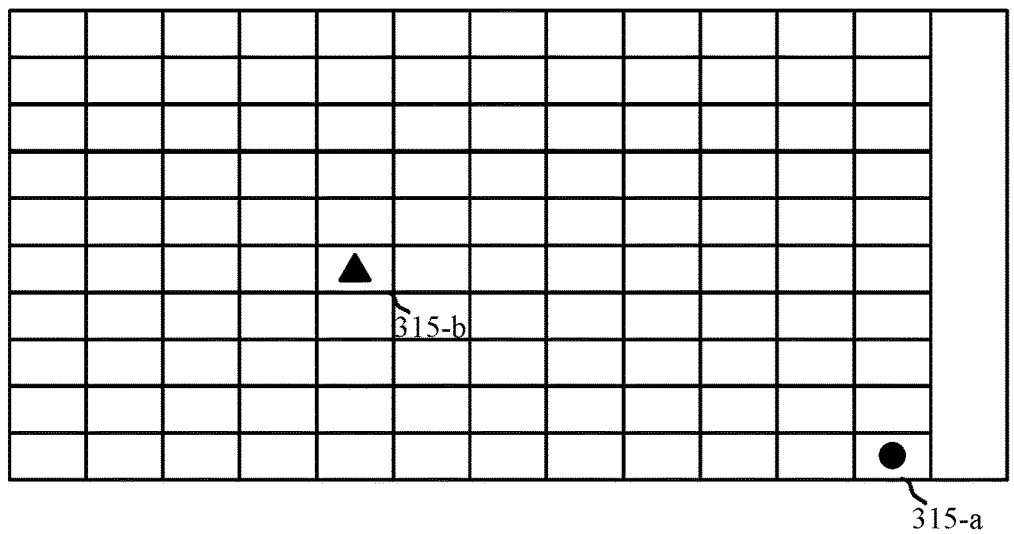
FIG. 3 illustrates an example of a mapping grid that supports collision avoidance and implicit location encoding in V2P networks in accordance with aspects of the present disclosure.
Figure 3:
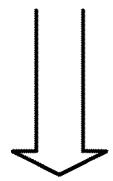
Figure 3:
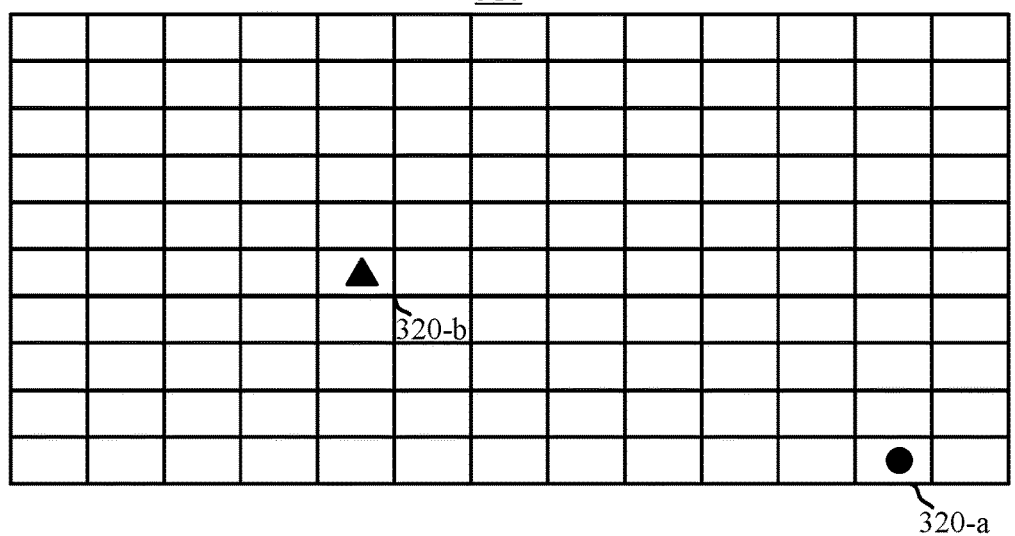

FIG. 3 illustrates an example of a mapping grid 300 that supports collision avoidance and implicit location encoding in V2P networks in accordance with aspects of the present disclosure. In some examples, mapping grid 300 may implement aspects of wireless communication systems 100 and/or 200. Aspects of mapping grid 300 may be implemented by a transmitting device and/or a receiving device, which may be examples of a UE, base station, V2P device, etc., as described herein. Generally, mapping grid 300 illustrates one example for mapping a CV2X slot 305 to a LA 310.

Broadly, mapping grid 300 illustrates one example of mapping a CV2X slot 305 to a LA 310 by mapping each RS 315 of CV2X slot 305 to a corresponding LU 320 of location grid 310. As discussed in the illustrative example above, a physical location, such as LU 320 may correspond to a 3 m by 3 m physical location. RS 315 may correspond to a time-frequency resource consisting of one symbol by 10 resource blocks within CV2X slot 305. For a given CV2X slot 305, every RS 315 is mapped to a corresponding LU 320 of LA 310. Moreover, each LA 310 may correspond to a unique orthogonal sequence, e.g., each LA 310 may have a unique orthogonal identifier that is used to generate a sequence number such that adjacent LAs correspond to different sequence numbers and are mapped to the same CV2X slot.

Accordingly, the first transmitting device (illustrated by a circle in FIG. 3) may identify its location data associated with its physical location (e.g., determine its coordinates based on the integrated GPS receiver). The first transmitting device may identify a time-frequency resource within CV2X slot 305 that corresponds to at least a portion of the location data associated with the physical location of the transmitting device (e.g., the LSBs of its coordinates). Accordingly, the first transmitting device may generate a sequence based on the portion of the location data (e.g., the LU 320-a within LA 310), on the CV2X slot 305, and/or the time-frequency resource (e.g., the RS 315-a). The first transmitting device may use the sequence to encode a signal that is transmitted using the time-frequency resource to indicate the physical location of the first transmitting device.

Similarly, a second transmitting device (illustrated by a triangle in FIG. 3) may identify its location data associated with its physical location (e.g., determine its coordinates based on the integrated GPS receiver). The second transmitting device may identify a time-frequency resource within CV2X slot 305 that corresponds to at least a portion of the location data associated with the physical location of the second transmitting device (e.g., the LSBs of its coordinates). Accordingly, the second transmitting device may generate a sequence based on the portion of the location data (e.g., the LU 320-b within LA 310), on the CV2X slot 305, and/or the time-frequency resource (e.g., the RS 315-b). The second transmitting device may use the sequence to encode a signal that is transmitted using the time-frequency resource to indicate the physical location of the second transmitting device.

Accordingly, a receiving device may receive each signal transmitted from the first and second transmitting devices over their respective time-frequency resources within CV2X slot 305. The receiving device may attempt to decode each signal using a set of available sequences, with each sequence associated with a different time-frequency resource and CV2X slot 305. The receiving device may identify the respective sequence for each signal from the set of available sequences by successfully decoding the signal (e.g., by correlating the signal using the set of available sequences), and use the identified sequences, time-frequency resource (e.g., RS 315), and/or CV2X slot 305 to determine the location of the respective transmitting devices (e.g., LU 320). Accordingly, the receiving device may determine that the LU 320-a corresponding to the first transmitting device (e.g., the circle) is occupied by a first pedestrian (e.g., the first V2P device) and that the LU 320-b corresponding to the second transmitting device (e.g., the triangle) is occupied by a second pedestrian (e.g., the second V2P device).

Figure 4:
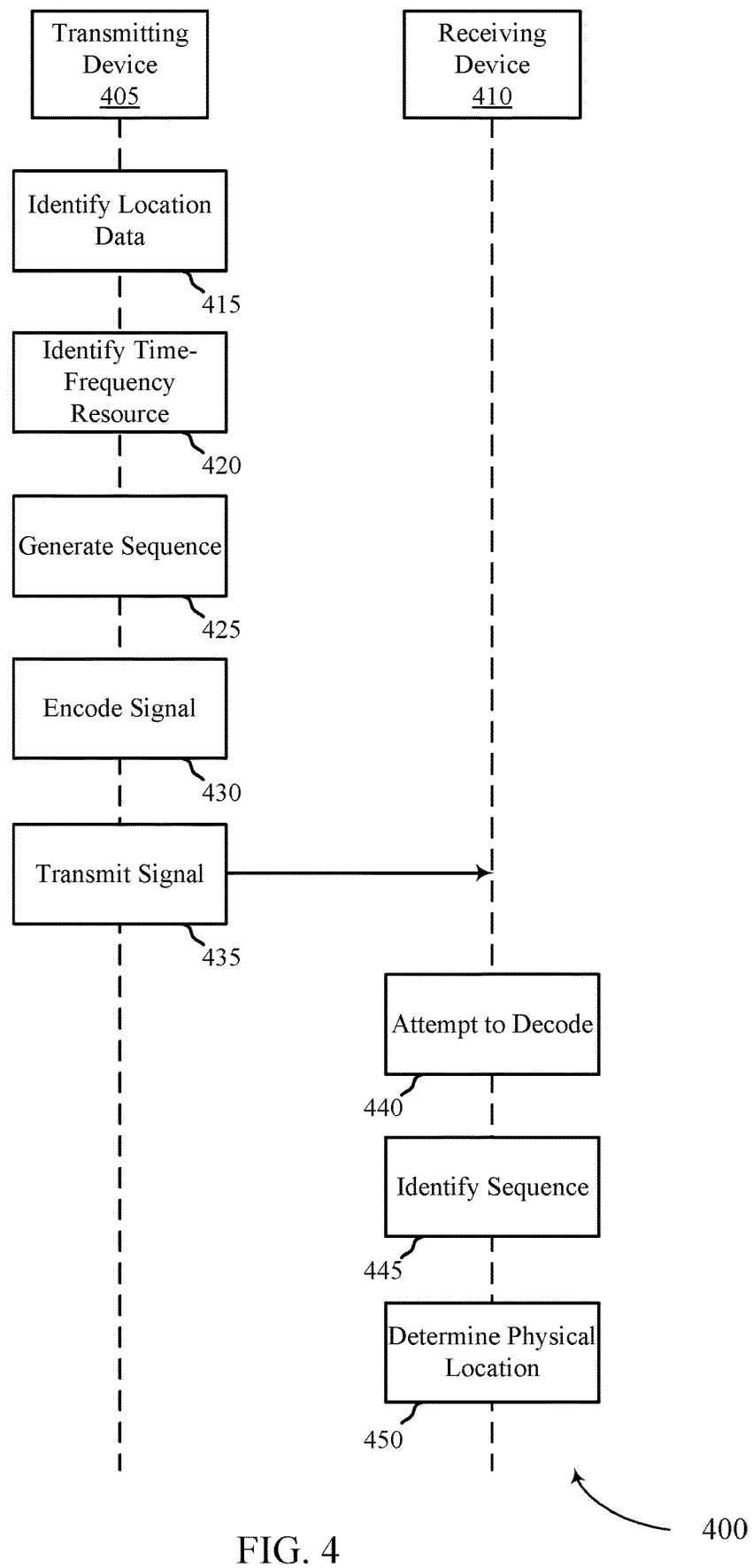
FIG. 4 illustrates an example of a process that supports collision avoidance and implicit location encoding in V2P networks in accordance with aspects of the present disclosure.

FIG. 4 illustrates an example of a process 400 that supports collision avoidance and implicit location encoding in V2P networks in accordance with aspects of the present disclosure. In some examples, process 400 may implement aspects of wireless communication systems 100 and/or 200, and/or mapping configuration 300. Aspects of process 400 may be implemented by a transmitting device 405 and/or receiving device 410, which may be examples of corresponding devices described herein. In some aspects, transmitting device 405 may be an example of a V2P device and a receiving device 410 may be an example of a V2P device, a V2V device, a V2I device, a UE, a base station, and the like.

At 415, transmitting device 405 may identify location data associated with a physical location (e.g., its LU) of transmitting device 405. In some aspects, this may include a transmitting device 405 determining that the physical location of transmitting device 405 lies within a location area of a set of available location areas, with the sequence based at least in part on the location area. In some aspects, each location area within the set of available location areas may include a grid of geographic areas (e.g., LUs), with each geographic area corresponding to a time-frequency resource (e.g., RSs). In some aspects, this may include transmitting device 405 retrieving information identifying the coordinates from a GPS receiver of transmitting device 405. The location data may include the coordinates, with the portion of the location data corresponding to the LSBs of the coordinates.

At 420, transmitting device 405 may identify a time-frequency resource within a slot, the time-frequency resource corresponding to at least a portion of the location data associated with the physical location of transmitting device 405. In some aspects, this may include transmitting device 405 identifying an RS corresponding to the physical location (e.g., LU) of transmitting device 405.

At 425, transmitting device 405 may generate a sequence based at least in part on the portion of the location data (e.g., the LU), the slot, and/or the time-frequency resource (e.g., the RS). That is, the sequences may be based on which slot (e.g., which CV2X slot) and which time-frequency resources within the slot correspond to the portion of the location data.

At 430, transmitting device 405 may encode a signal using the sequence. For example, transmitting device 405 may use a sequence to encode one bit or two bits or some other small amount of bits to be transmitted in the slot using the time-frequency resource. This may reduce the amount of information required to be transmitted from transmitting device 405 when reporting its location.

At 435, transmitting device 405 may transmit (and receiving device 410 may receive) the signal using the identified time-frequency resource within the slot to indicate the physical location of transmitting device 405.

At 440, receiving device 410 may attempt to decode the signal using a set of available sequences (e.g., correlate the signal using the set of available sequences), with each sequence in the set of available sequences associated with time-frequency resources in the slot. In some aspects, this may include receiving device 410 identifying the set of available sequences based on the slot and the time-frequency resources located within the slot. Receiving device 410 may know the available portions of location data that correspond to the time-frequency resources within the slot, and use this information to generate the sequences in the set of available sequences.

At 445, receiving device 410 may identify the sequence from the set of available sequences based at least in part on successfully decoding the signal (e.g., successfully correlating the signal) using the sequence. That is, the signal may only be successfully decoded using the same sequence that was used to encode the signal by transmitting device 405. Accordingly, the receiving device 410 successfully decoding the signal using a particular sequence from the set of available sequences may signal that the particular sequence is the sequence that was used by transmitting device 405 to encode the signal. In some aspects, this may include receiving device 410 decoding all available sequences on all of the time-frequency resources within the slot.

At 450, receiving device 410 may determine a physical location of transmitting device 405 based at least in part on the time-frequency resource, the slot, and/or the sequence. Accordingly, receiving device 410 may mark that physical location as being occupied by pedestrian (e.g., a V2P device).

Figure 5:
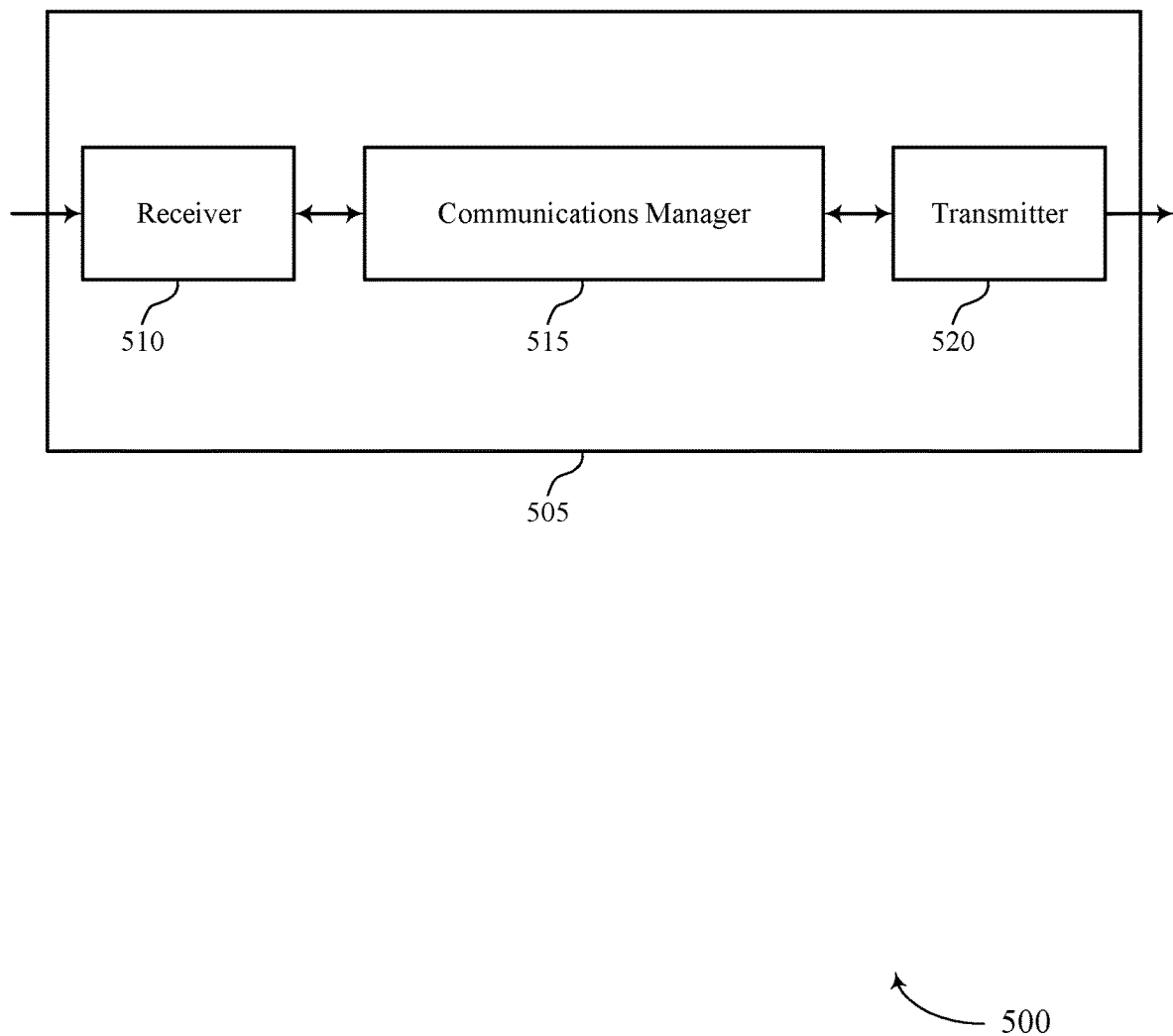
FIGS. 5 and 6 show block diagrams of devices that support collision avoidance and implicit location encoding in V2P networks in accordance with aspects of the present disclosure.

FIG. 5 shows a block diagram 500 of a device 505 that supports collision avoidance and implicit location encoding in V2P networks in accordance with aspects of the present disclosure. The device 505 may be an example of aspects of a UE 115, a transmitting device, a receiving device, etc., as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to collision avoidance and implicit location encoding in V2P networks, etc.). Information may be passed on to other components of the device 505. The receiver 510 may be an example of aspects of the transceiver 820 described with reference to FIG. 8. The receiver 510 may utilize a single antenna or a set of antennas.

When device 505 is configured as a transmitting device, the communications manager 515 may identify location data associated with a physical location of the transmitting device, identify a time-frequency resource within a slot, the time-frequency resource corresponding to at least a portion of the location data associated with the physical location of the transmitting device, transmit the signal using the identified time-frequency resource to indicate the physical location of the transmitting device, generate a sequence based on the portion of the location data, or the slot, or the time-frequency resource, or a combination thereof, and encode a signal using the sequence.

When device 505 is configured as a receiving device, the communications manager 515 may also receive a signal from a transmitting device over a time-frequency resource within a slot, attempt to decode the signal using a set of available sequences, each sequence in the set of available sequences associated with the time-frequency resource and the slot, identify a sequence from the set of available sequences based on successfully decoding the signal (e.g., correlating the signal) using the sequence, and determine a physical location of the transmitting device based on the time-frequency resource, or the slot, or the sequence, or a combination thereof. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
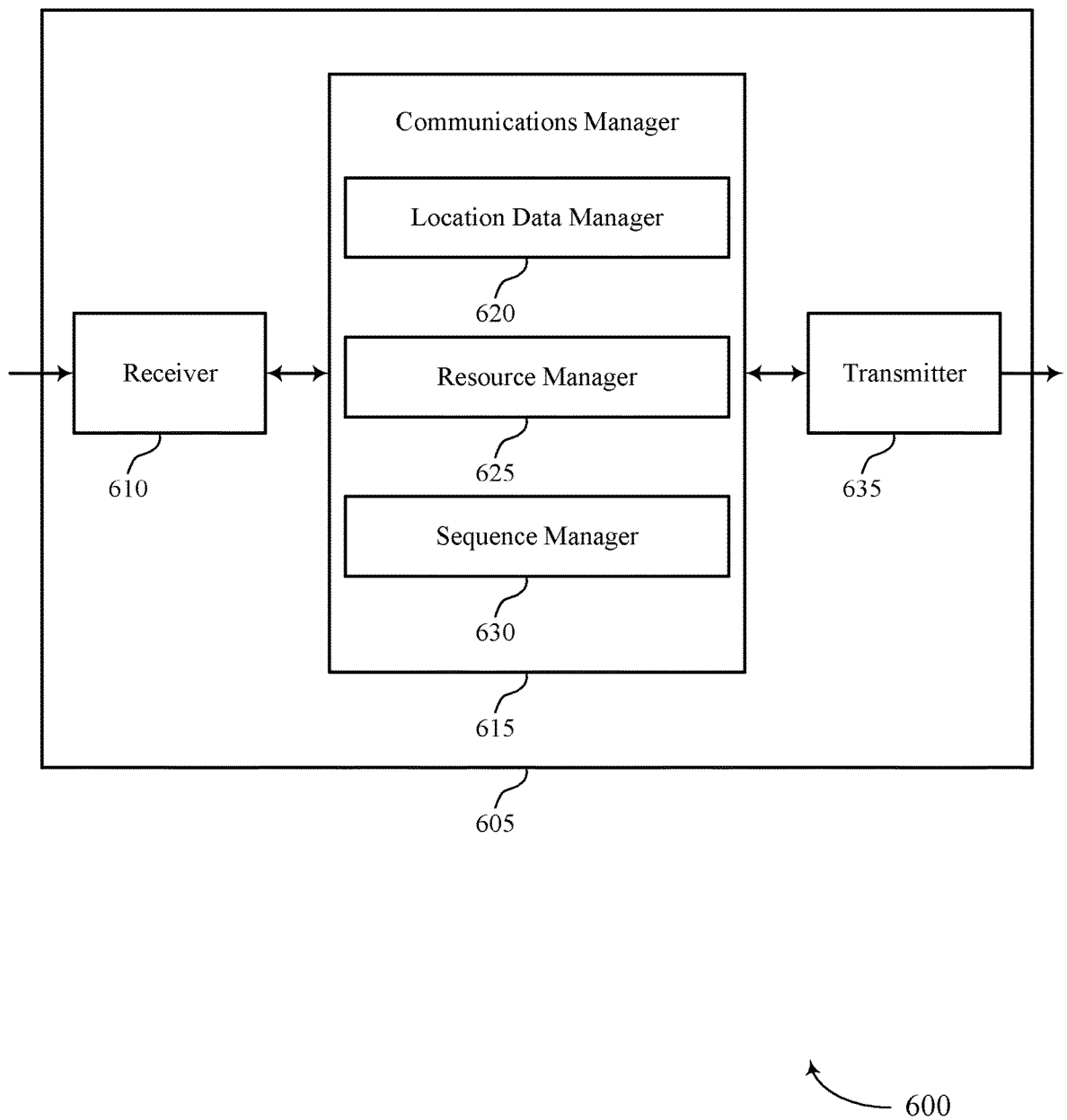

FIG. 6 shows a block diagram 600 of a device 605 that supports collision avoidance and implicit location encoding in V2P networks in accordance with aspects of the present disclosure. The device 605 may be an example of aspects of a device 505, a UE 115, a transmitting device, a receiving device, etc., as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to collision avoidance and implicit location encoding in V2P networks, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a location data manager 620, a resource manager 625, and a sequence manager 630. The communications manager 615 may be an example of aspects of the communications manager 810 described herein.

When device 605 is configured as a transmitting device, the location data manager 620 may identify location data associated with a physical location of the transmitting device.

When device 605 is configured as a transmitting device, the resource manager 625 may identify a time-frequency resource within a slot, the time-frequency resource corresponding to at least a portion of the location data associated with the physical location of the transmitting device and transmit the signal using the identified time-frequency resource to indicate the physical location of the transmitting device.

When device 605 is configured as a transmitting device, the sequence manager 630 may generate a sequence based on the portion of the location data, or the slot, or the time-frequency resource, or a combination thereof and encode a signal using the sequence.

When device 605 is configured as a receiving device, the resource manager 625 may receive a signal from a transmitting device over a time-frequency resource within a slot.

When device 605 is configured as a receiving device, the sequence manager 630 may attempt to decode the signal using a set of available sequences, each sequence in the set of available sequences associated with the time-frequency resource and the slot and identify a sequence from the set of available sequences based on successfully decoding the signal (e.g., correlating the signal) using the sequence.

When device 605 is configured as a receiving device, the location data manager 620 may determine a physical location of the transmitting device based on the time-frequency resource, or the slot, or the sequence, or a combination thereof.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
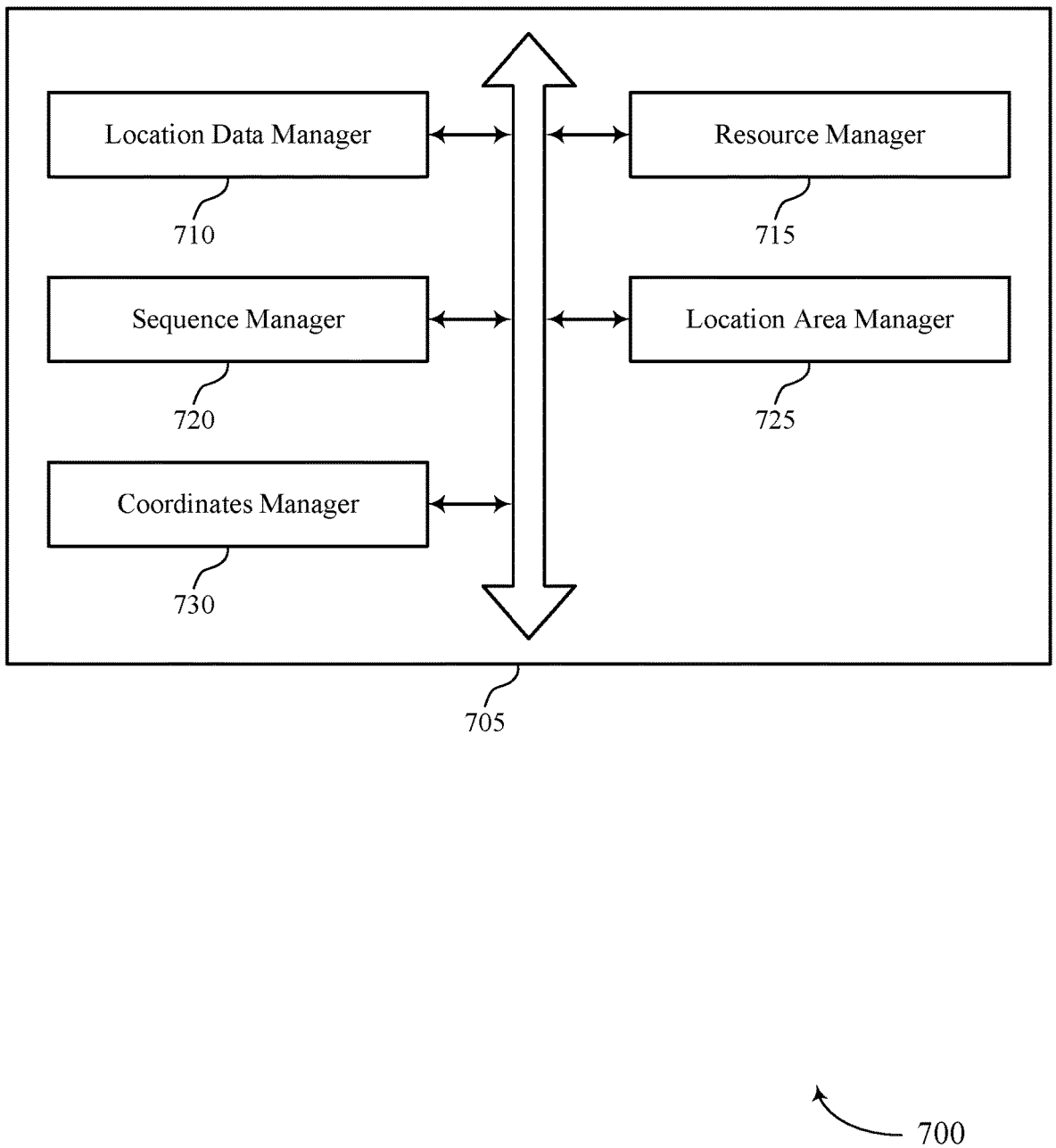
FIG. 7 shows a block diagram of a communications manager that supports collision avoidance and implicit location encoding in V2P networks in accordance with aspects of the present disclosure.

FIG. 7 shows a block diagram 700 of a communications manager 705 that supports collision avoidance and implicit location encoding in V2P networks in accordance with aspects of the present disclosure. The communications manager 705 may be an example of aspects of a communications manager 515, a communications manager 615, or a communications manager 810 described herein. The communications manager 705 may include a location data manager 710, a resource manager 715, a sequence manager 720, a location area manager 725, and a coordinates manager 730. Each of these modules may communicate, directly or indirectly, with one another (e.g., via one or more buses).

The location data manager 710 may identify location data associated with a physical location of the transmitting device. In some examples, the location data manager 710 may determine a physical location of the transmitting device based on the time-frequency resource, or the slot, or the sequence, or a combination thereof.

The resource manager 715 may identify a time-frequency resource within a slot, the time-frequency resource corresponding to at least a portion of the location data associated with the physical location of the transmitting device. In some examples, the resource manager 715 may transmit the signal using the identified time-frequency resource to indicate the physical location of the transmitting device. In some examples, the resource manager 715 may receive a signal from a transmitting device over a time-frequency resource within a slot.

The sequence manager 720 may generate a sequence based on the portion of the location data, or the slot, or the time-frequency resource, or a combination thereof. In some examples, the sequence manager 720 may encode a signal using the sequence. In some examples, the sequence manager 720 may attempt to decode the signal using a set of available sequences, each sequence in the set of available sequences associated with the time-frequency resource and the slot. In some examples, the sequence manager 720 may identify a sequence from the set of available sequences based on successfully decoding the signal (e.g., correlating the signal) using the sequence.

The location area manager 725 may determine that the physical location of the transmitting device lies within a location area of a set of available location areas, where the sequence is based on the location area. In some examples, the location area manager 725 may determine that the physical location of the transmitting device lies within a location area of a set of available location areas, where the sequence is based on the location area. In some cases, each location area within the set of available location areas includes a grid of geographic areas, each geographic area corresponding to a time-frequency resource.

The coordinates manager 730 may retrieve information identifying the coordinates from a GPS of the transmitting device. In some examples, the coordinates manager 730 may identify, based on the sequence, at least a portion of coordinates associated with the physical location of the transmitting device. In some examples, identifying LSBs of the coordinates based on the time-frequency resource, where the portion of the coordinates includes the LSBs of the coordinates.

Figure 8:
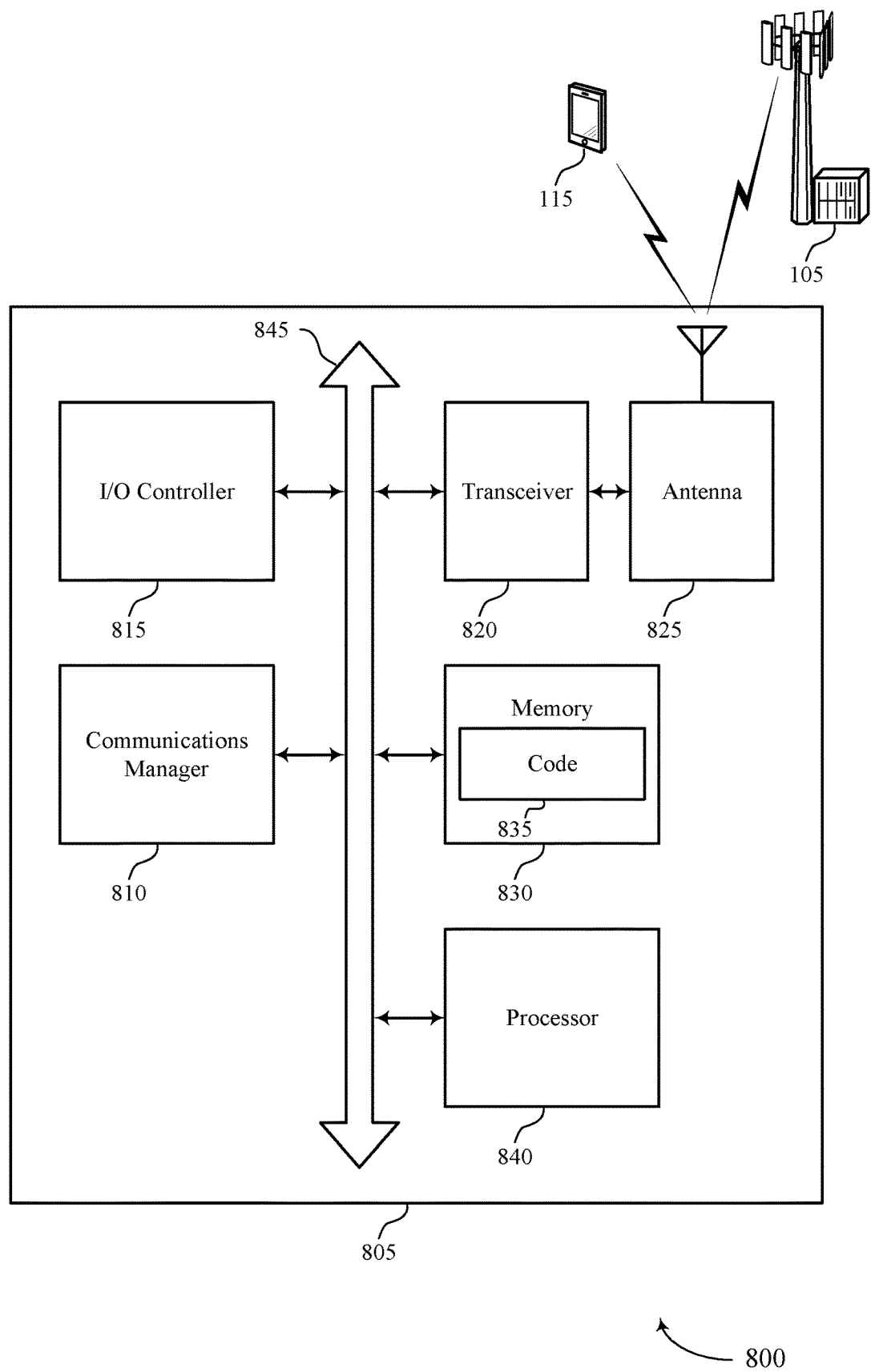
FIG. 8 shows a diagram of a system including a device that supports collision avoidance and implicit location encoding in V2P networks in accordance with aspects of the present disclosure.

FIG. 8 shows a diagram of a system 800 including a device 805 that supports collision avoidance and implicit location encoding in V2P networks in accordance with aspects of the present disclosure. The device 805 may be an example of or include the components of device 505, device 605, a UE 115, a transmitting device, a receiving device, etc., as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

When device 805 is configured as a transmitting device, the communications manager 810 may identify location data associated with a physical location of the transmitting device, identify a time-frequency resource within a slot, the time-frequency resource corresponding to at least a portion of the location data associated with the physical location of the transmitting device, transmit the signal using the identified time-frequency resource to indicate the physical location of the transmitting device, generate a sequence based on the portion of the location data, or the slot, or the time-frequency resource, or a combination thereof, and encode a signal using the sequence.

When device 605 is configured as a receiving device, the communications manager 810 may also receive a signal from a transmitting device over a time-frequency resource within a slot, attempt to decode the signal using a set of available sequences, each sequence in the set of available sequences associated with the time-frequency resource and the slot, identify a sequence from the set of available sequences based on successfully decoding the signal (e.g., correlating the signal) using the sequence, and determine a physical location of the transmitting device based on the time-frequency resource, or the slot, or the sequence, or a combination thereof.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touch-screen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random access memory (RAM) and read-only memory (ROM). The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting collision avoidance and implicit location encoding in V2P networks).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
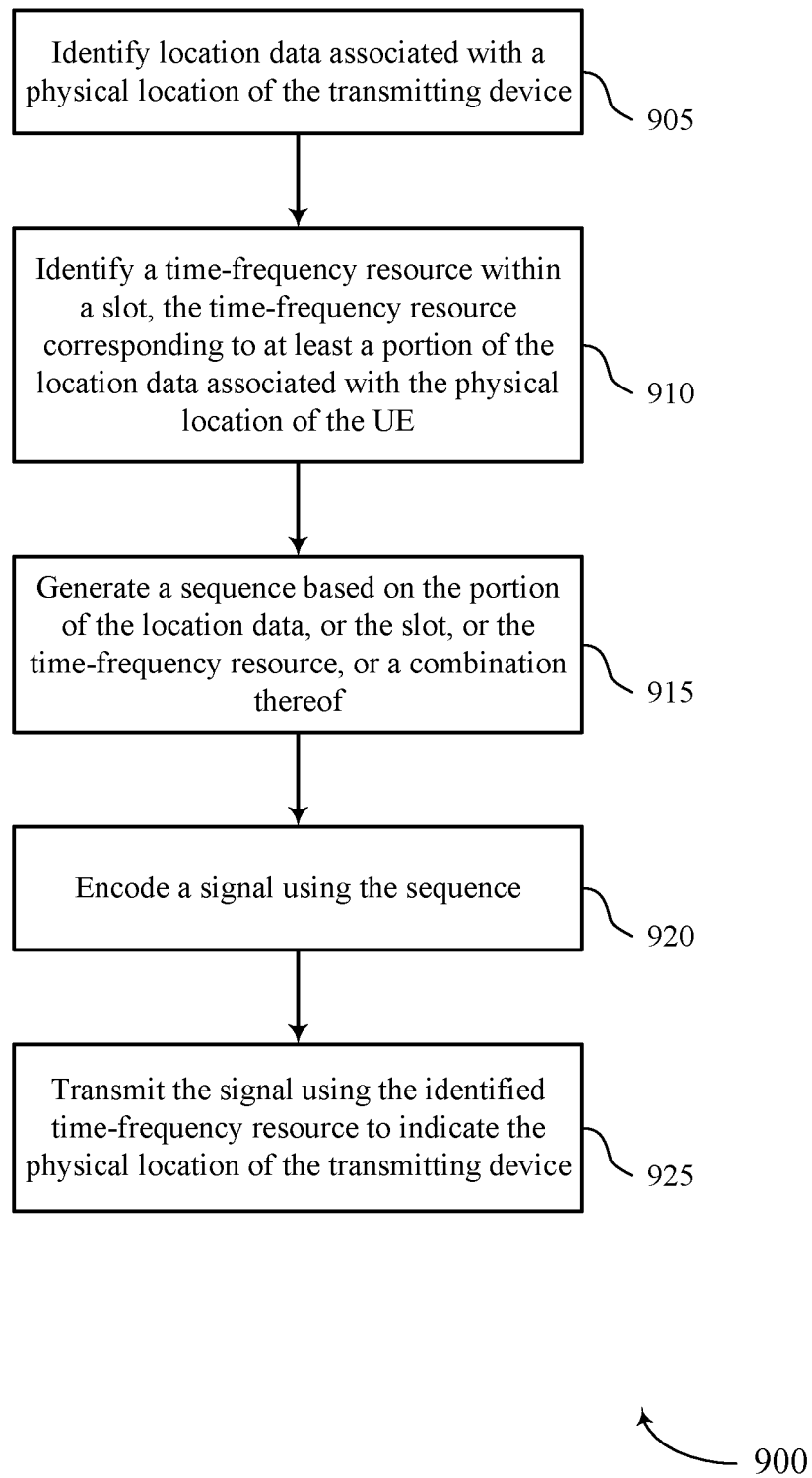
FIGS. 9 through 13 show flowcharts illustrating methods that support collision avoidance and implicit location encoding in V2P networks in accordance with aspects of the present disclosure.

FIG. 9 shows a flowchart illustrating a method 900 that supports collision avoidance and implicit location encoding in V2P networks in accordance with aspects of the present disclosure. The operations of method 900 may be implemented by a UE 115 (e.g., a UE 115 configured as a transmitting device) or its components as described herein. For example, the operations of method 900 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 905, the UE may identify location data associated with a physical location of the transmitting device. The operations of 905 may be performed according to the methods described herein. In some examples, aspects of the operations of 905 may be performed by a location data manager as described with reference to FIGS. 5 through 8.

At 910, the UE may identify a time-frequency resource within a slot, the time-frequency resource corresponding to at least a portion of the location data associated with the physical location of the transmitting device the operations of 910 may be performed according to the methods described herein. In some examples, aspects of the operations of 910 may be performed by a resource manager as described with reference to FIGS. 5 through 8.

At 915, the UE may generate a sequence based on the portion of the location data, or the slot, or the time-frequency resource, or a combination thereof. The operations of 915 may be performed according to the methods described herein. In some examples, aspects of the operations of 915 may be performed by a sequence manager as described with reference to FIGS. 5 through 8.

At 920, the UE may encode a signal using the sequence. The operations of 920 may be performed according to the methods described herein. In some examples, aspects of the operations of 920 may be performed by a sequence manager as described with reference to FIGS. 5 through 8.

At 925, the UE may transmit the signal using the identified time-frequency resource to indicate the physical location of the transmitting device. The operations of 925 may be performed according to the methods described herein. In some examples, aspects of the operations of 925 may be performed by a resource manager as described with reference to FIGS. 5 through 8.

Figure 10:
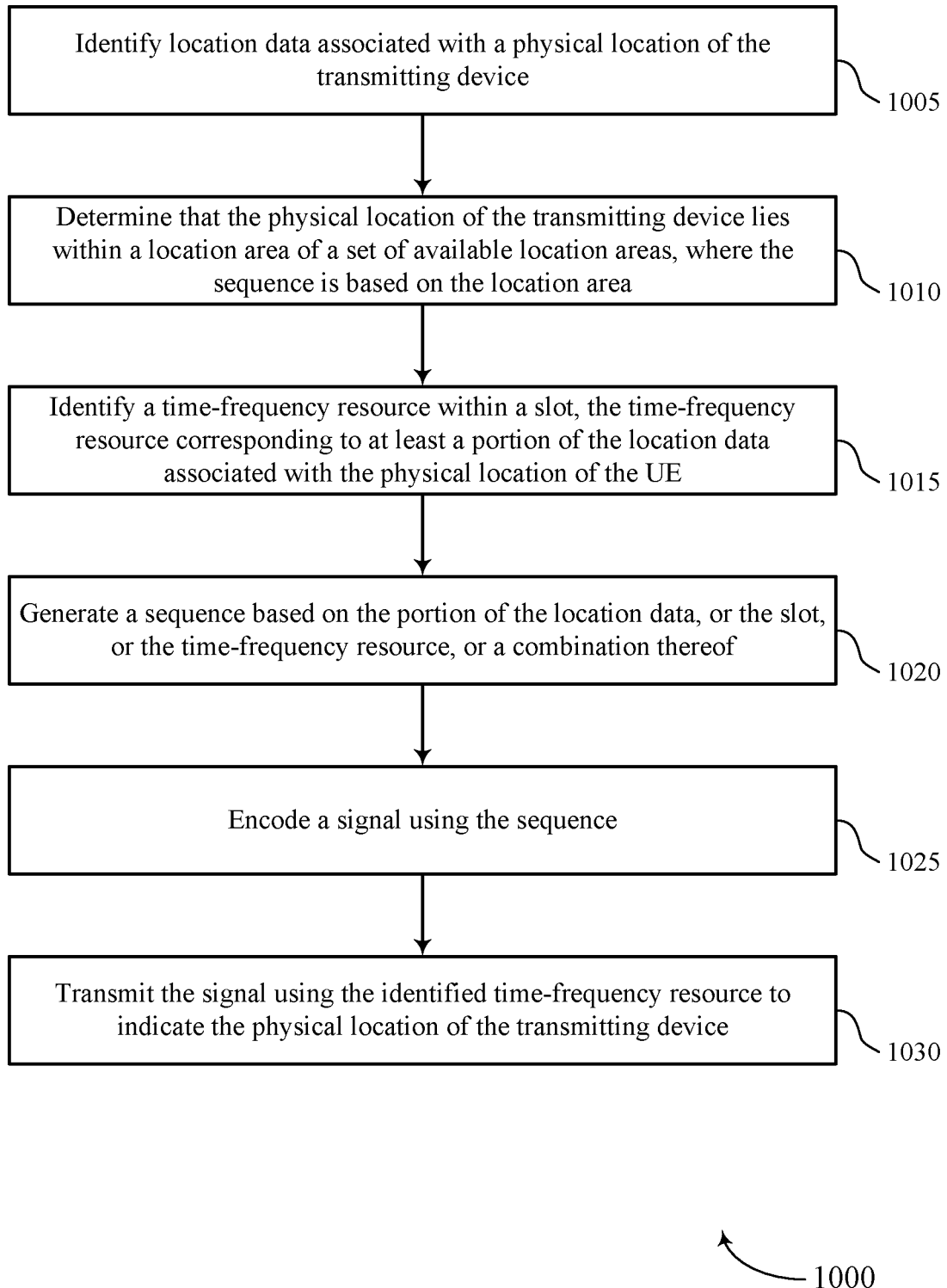

FIG. 10 shows a flowchart illustrating a method 1000 that supports collision avoidance and implicit location encoding in V2P networks in accordance with aspects of the present disclosure. The operations of method 1000 may be implemented by a UE 115 (e.g., a UE 115 configured as a transmitting device) or its components as described herein. For example, the operations of method 1000 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1005, the UE may identify location data associated with a physical location of the transmitting device. The operations of 1005 may be performed according to the methods described herein. In some examples, aspects of the operations of 1005 may be performed by a location data manager as described with reference to FIGS. 5 through 8.

At 1010, the UE may determine that the physical location of the transmitting device lies within a location area of a set of available location areas, where the sequence is based on the location area. The operations of 1010 may be performed according to the methods described herein. In some examples, aspects of the operations of 1010 may be performed by a location area manager as described with reference to FIGS. 5 through 8.

At 1015, the UE may identify a time-frequency resource within a slot, the time-frequency resource corresponding to at least a portion of the location data associated with the physical location of the transmitting device the operations of 1015 may be performed according to the methods described herein. In some examples, aspects of the operations of 1015 may be performed by a resource manager as described with reference to FIGS. 5 through 8.

At 1020, the UE may generate a sequence based on the portion of the location data, or the slot, or the time-frequency resource, or a combination thereof. The operations of 1020 may be performed according to the methods described herein. In some examples, aspects of the operations of 1020 may be performed by a sequence manager as described with reference to FIGS. 5 through 8.

At 1025, the UE may encode a signal using the sequence. The operations of 1025 may be performed according to the methods described herein. In some examples, aspects of the operations of 1025 may be performed by a sequence manager as described with reference to FIGS. 5 through 8.

At 1030, the UE may transmit the signal using the identified time-frequency resource to indicate the physical location of the transmitting device. The operations of 1030 may be performed according to the methods described herein. In some examples, aspects of the operations of 1030 may be performed by a resource manager as described with reference to FIGS. 5 through 8.

Figure 11:
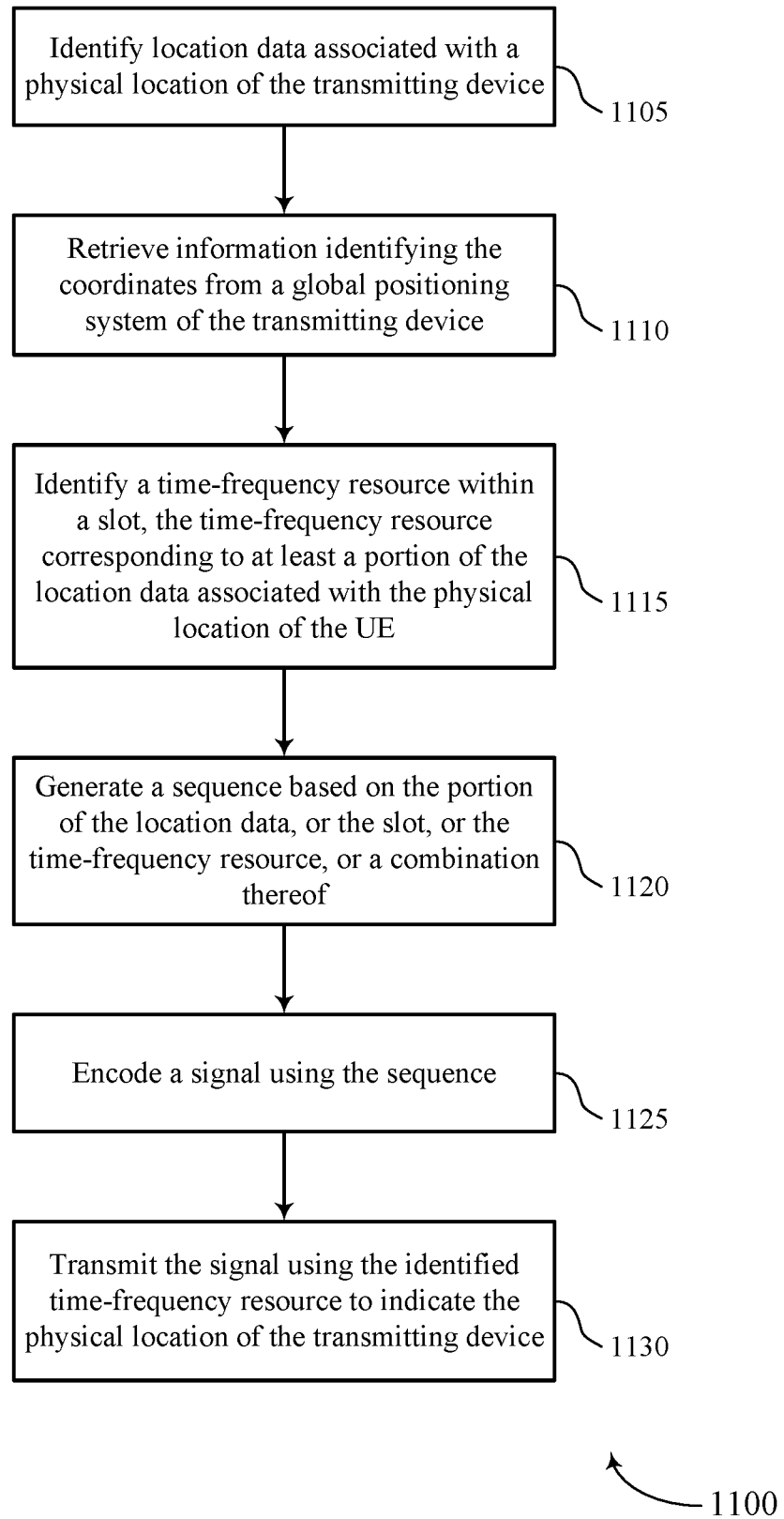

FIG. 11 shows a flowchart illustrating a method 1100 that supports collision avoidance and implicit location encoding in V2P networks in accordance with aspects of the present disclosure. The operations of method 1100 may be implemented by a UE 115 (e.g., a UE 115 configured as a transmitting device) or its components as described herein. For example, the operations of method 1100 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1105, the UE may identify location data associated with a physical location of the transmitting device. The operations of 1105 may be performed according to the methods described herein. In some examples, aspects of the operations of 1105 may be performed by a location data manager as described with reference to FIGS. 5 through 8.

At 1110, the UE may retrieve information identifying the coordinates from a GPS of the transmitting device. The operations of 1110 may be performed according to the methods described herein. In some examples, aspects of the operations of 1110 may be performed by a coordinates manager as described with reference to FIGS. 5 through 8.

At 1115, the UE may identify a time-frequency resource within a slot, the time-frequency resource corresponding to at least a portion of the location data associated with the physical location of the transmitting device the operations of 1115 may be performed according to the methods described herein. In some examples, aspects of the operations of 1115 may be performed by a resource manager as described with reference to FIGS. 5 through 8.

At 1120, the UE may generate a sequence based on the portion of the location data, or the slot, or the time-frequency resource, or a combination thereof. The operations of 1120 may be performed according to the methods described herein. In some examples, aspects of the operations of 1120 may be performed by a sequence manager as described with reference to FIGS. 5 through 8.

At 1125, the UE may encode a signal using the sequence. The operations of 1125 may be performed according to the methods described herein. In some examples, aspects of the operations of 1125 may be performed by a sequence manager as described with reference to FIGS. 5 through 8.

At 1130, the UE may transmit the signal using the identified time-frequency resource to indicate the physical location of the transmitting device. The operations of 1130 may be performed according to the methods described herein. In some examples, aspects of the operations of 1130 may be performed by a resource manager as described with reference to FIGS. 5 through 8.

Figure 12:
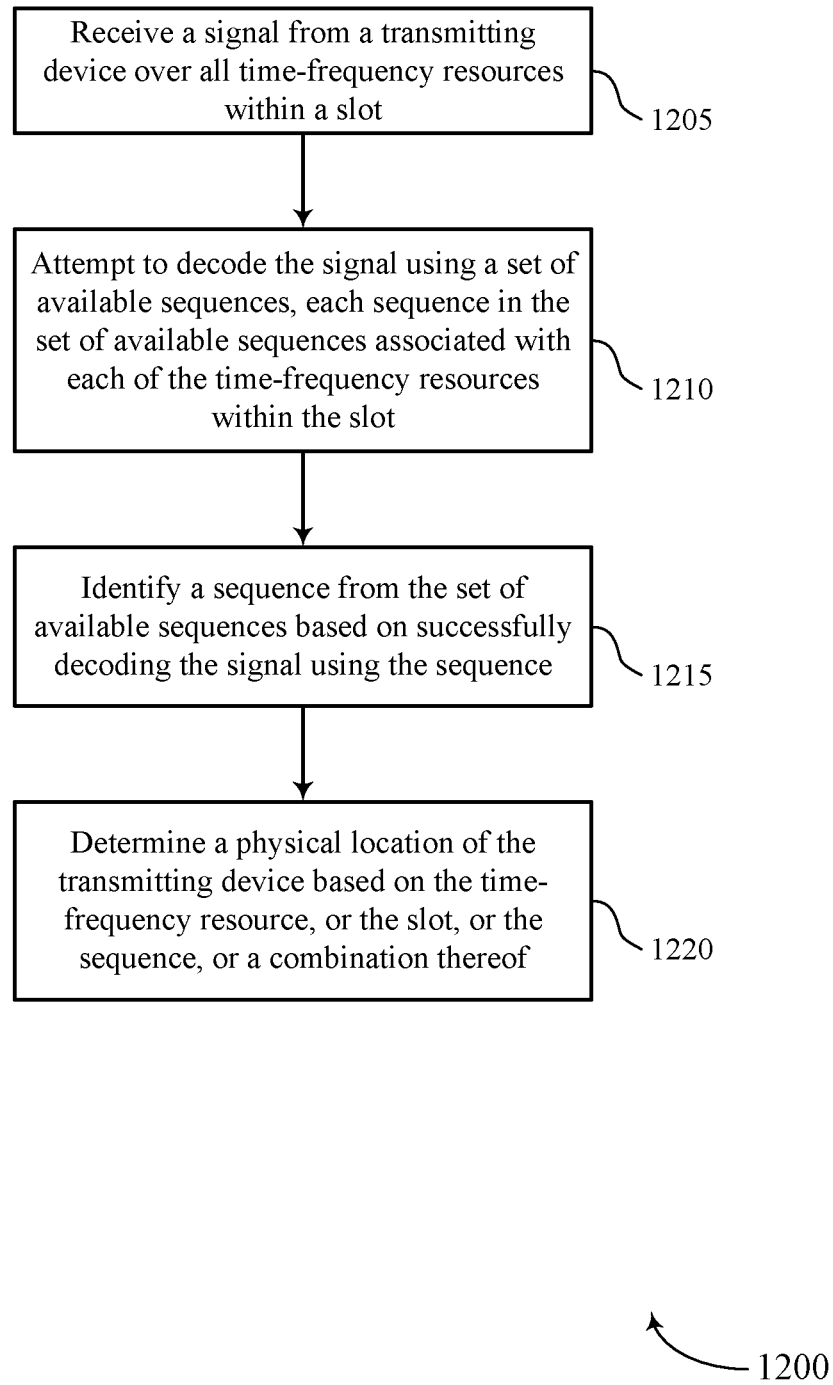

FIG. 12 shows a flowchart illustrating a method 1200 that supports collision avoidance and implicit location encoding in V2P networks in accordance with aspects of the present disclosure. The operations of method 1200 may be implemented by a UE 115 (e.g., a UE 115 configured as a receiving device) or its components as described herein. For example, the operations of method 1200 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1205, the UE may receive a signal from a transmitting device over a time-frequency resource within a slot. The operations of 1205 may be performed according to the methods described herein. In some examples, aspects of the operations of 1205 may be performed by a resource manager as described with reference to FIGS. 5 through 8.

At 1210, the UE may attempt to decode the signal using a set of available sequences, each sequence in the set of available sequences associated with the time-frequency resource and the slot. The operations of 1210 may be performed according to the methods described herein. In some examples, aspects of the operations of 1210 may be performed by a sequence manager as described with reference to FIGS. 5 through 8.

At 1215, the UE may identify a sequence from the set of available sequences based on successfully decoding the signal (e.g., correlating the signal) using the sequence. The operations of 1215 may be performed according to the methods described herein. In some examples, aspects of the operations of 1215 may be performed by a sequence manager as described with reference to FIGS. 5 through 8.

At 1220, the UE may determine a physical location of the transmitting device based on the time-frequency resource, or the slot, or the sequence, or a combination thereof. The operations of 1220 may be performed according to the methods described herein. In some examples, aspects of the operations of 1220 may be performed by a location data manager as described with reference to FIGS. 5 through 8.

Figure 13:
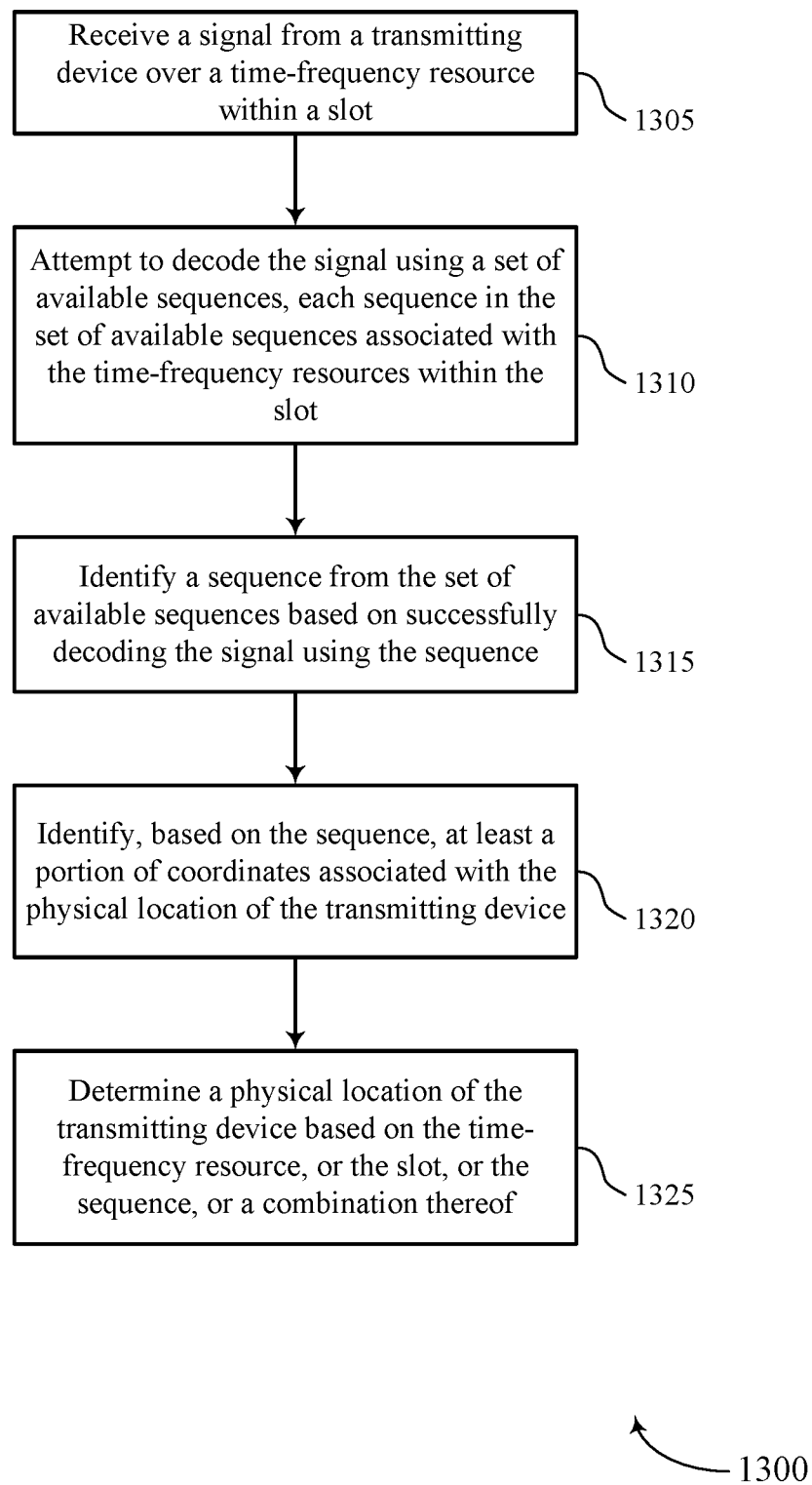

FIG. 13 shows a flowchart illustrating a method 1300 that supports collision avoidance and implicit location encoding in V2P networks in accordance with aspects of the present disclosure. The operations of method 1300 may be implemented by a UE 115 (e.g., a UE 115 configured as a receiving device) or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may receive a signal from a transmitting device over a time-frequency resource within a slot. The operations of 1305 may be performed according to the methods described herein. In some examples, aspects of the operations of 1305 may be performed by a resource manager as described with reference to FIGS. 5 through 8.

At 1310, the UE may attempt to decode the signal using a set of available sequences, each sequence in the set of available sequences associated with the time-frequency resource and the slot. The operations of 1310 may be performed according to the methods described herein. In some examples, aspects of the operations of 1310 may be performed by a sequence manager as described with reference to FIGS. 5 through 8.

At 1315, the UE may identify a sequence from the set of available sequences based on successfully decoding the signal (e.g., correlating the signal) using the sequence. The operations of 1315 may be performed according to the methods described herein. In some examples, aspects of the operations of 1315 may be performed by a sequence manager as described with reference to FIGS. 5 through 8.

At 1320, the UE may identify, based on the sequence, at least a portion of coordinates associated with the physical location of the transmitting device. The operations of 1320 may be performed according to the methods described herein. In some examples, aspects of the operations of 1320 may be performed by a coordinates manager as described with reference to FIGS. 5 through 8.

At 1325, the UE may determine a physical location of the transmitting device based on the time-frequency resource, or the slot, or the sequence, or a combination thereof. The operations of 1325 may be performed according to the methods described herein. In some examples, aspects of the operations of 1325 may be performed by a location data manager as described with reference to FIGS. 5 through 8.

It should be noted that the methods described herein describe possible implementations, and that the operations and the steps may be rearranged or otherwise modified and that other implementations are possible. Further, aspects from two or more of the methods may be combined.

Aspects of the following examples may be combined with any of the previous embodiments or aspects described herein. Thus, example 1 is a method for wireless communication at a transmitting device, comprising: identifying location data associated with a physical location of the transmitting device; identifying a time-frequency resource within a slot, the time-frequency resource corresponding to at least a portion of the location data associated with the physical location of the transmitting device; generating a sequence based at least in part on the portion of the location data, or the slot, or the time-frequency resource, or a combination thereof; encoding a signal using the sequence; and transmitting the signal using the identified time-frequency resource to indicate the physical location of the transmitting device.

In example 2, the method of example 1 may include: determining that the physical location of the transmitting device lies within a location area of a set of available location areas, wherein the sequence is based at least in part on the location area.

In example 3, the method of examples 1-2 may include each location area within the set of available location areas comprising a grid of geographic areas, each geographic area corresponding to a time-frequency resource.

In example 4, the method of examples 1-3 may include the location data comprises coordinates, comprising: retrieving information identifying the coordinates from a GPS of the transmitting device.

In example 5, the method of examples 1-4 may include the location data comprising coordinates, comprising: identifying the LSBs of the coordinates, wherein the portion of the location data comprises the LSBs.

Example 6 is a method for wireless communication at a receiving device, comprising: receiving a signal from a transmitting device over a time-frequency resource within a slot; attempting to decode the signal using a set of available sequences, each sequence in the set of available sequences associated with the time-frequency resource and the slot; identifying a sequence from the set of available sequences based at least in part on successfully decoding the signal using the sequence; and determining a physical location of the transmitting device based at least in part on the time-frequency resource, or the slot, or the sequence, or a combination thereof.

In example 7, the method of example 6 may include: determining that the physical location of the transmitting device lies within a location area of a set of available location areas, wherein the sequence is based at least in part on the location area.

In example 8, the method of examples 6-7 may include each location area within the set of available location areas comprising a grid of geographic areas, each geographic area corresponding to a time-frequency resource.

In example 9, the method of examples 6-8 may include determining the physical location of the transmitting device comprising: identifying, based at least in part on the sequence, at least a portion of coordinates associated with the physical location of the transmitting device.

In example 10, the method of examples 6-9 may include: identifying LSBs of the coordinates based at least in part on the time-frequency resource, wherein the portion of the coordinates comprises the LSBs of the coordinates.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS).

LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a transmitting device, comprising:
   identifying location coordinates corresponding to a physical location of the transmitting device;
   identifying a time-frequency resource within a slot, the time-frequency resource corresponding to at least a portion of the location coordinates corresponding to the physical location of the transmitting device;
   generating a sequence based at least in part on the portion of the location coordinates, or the slot, or the time-frequency resource, or a combination thereof;
   encoding a signal using the sequence; and
   transmitting the signal using the identified time-frequency resource to indicate the physical location of the transmitting device.

2. The method of claim 1, further comprising:
   determining that the physical location of the transmitting device lies within a location area of a set of available location areas, wherein the sequence is based at least in part on the location area.

3. The method of claim 2, wherein each location area within the set of available location areas comprises a grid of geographic areas, each geographic area corresponding to a time-frequency resource within a set of available time-frequency resources.

4. The method of claim 1, further comprising:
   retrieving information identifying the location coordinates from a global positioning system of the transmitting device.

5. The method of claim 1, further comprising:
   identifying least significant bits (LSBs) of the location coordinates.

6. A method for wireless communication at a receiving device, comprising:
   receiving a signal from a transmitting device over a time-frequency resource within a slot;
   attempting to decode the signal using a set of available sequences, each sequence in the set of available sequences associated with the time-frequency resource and the slot;
   identifying a sequence from the set of available sequences based at least in part on successfully decoding the signal using the sequence; and
   determining a physical location of the transmitting device based at least in part on the time-frequency resource, or the slot, or the sequence, or a combination thereof.

7. The method of claim 6, further comprising:
   determining that the physical location of the transmitting device lies within a location area of a set of available location areas, wherein the sequence is based at least in part on the location area.

8. The method of claim 7, wherein each location area within the set of available location areas comprises a grid of geographic areas, each geographic area corresponding to a time-frequency resource within a set of available time-frequency resources.

9. The method of claim 6, wherein determining the physical location of the transmitting device comprises:
   identifying, based at least in part on the sequence, at least a portion of coordinates associated with the physical location of the transmitting device.

10. The method of claim 9, further comprising:
    identifying least significant bits (LSBs) of the coordinates based at least in part on the time-frequency resource, wherein the portion of the coordinates comprises the LSBs of the coordinates.

11. An apparatus for wireless communication at a transmitting device, comprising:
    a processor,
    memory coupled with the processor; and
    instructions stored in the memory and executable by the processor to cause the apparatus to:
       identify location coordinates corresponding to a physical location of the transmitting device;
       identify a time-frequency resource within a slot, the time-frequency resource corresponding to at least a portion of the location coordinates corresponding to the physical location of the transmitting device;
       generate a sequence based at least in part on the portion of the location coordinates, or the slot, or the time-frequency resource, or a combination thereof;
       encode a signal using the sequence; and
       transmit the signal using the identified time-frequency resource to indicate the physical location of the transmitting device.

12. The apparatus of claim 11, wherein the instructions are further executable by the processor to cause the apparatus to:
    determine that the physical location of the transmitting device lies within a location area of a set of available location areas, wherein the sequence is based at least in part on the location area.

13. The apparatus of claim 12, wherein each location area within the set of available location areas comprises a grid of geographic areas, each geographic area corresponding to a time-frequency resource within a set of available time-frequency resources.

14. The apparatus of claim 11, wherein the instructions are further executable by the processor to cause the apparatus to:
    retrieve information identifying the location coordinates from a global positioning system of the transmitting device.

15. The apparatus of claim 11, wherein the instructions are further executable by the processor to cause the apparatus to:
    identify least significant bits (LSBs) of the location coordinates.

16. An apparatus for wireless communication at a receiving device, comprising:

a processor, memory coupled with the processor; and instructions stored in the memory and executable by the processor to cause the apparatus to:

receive a signal from a transmitting device over a time-frequency resource within a slot;

attempt to decode the signal using a set of available sequences, each sequence in the set of available sequences associated with the time-frequency resource and the slot;

identify a sequence from the set of available sequences based at least in part on successfully decoding the signal using the sequence; and determine a physical location of the transmitting device based at least in part on the time-frequency resource, or the slot, or the sequence, or a combination thereof.

17. The apparatus of claim 16, wherein the instructions are further executable by the processor to cause the apparatus to:

determine that the physical location of the transmitting device lies within a location area of a set of available location areas, wherein the sequence is based at least in part on the location area.

18. The apparatus of claim 17, wherein each location area within the set of available location areas comprises a grid of geographic areas, each geographic area corresponding to a time-frequency resource within a set of available time-frequency resources.

19. The apparatus of claim 16, wherein the instructions to determine the physical location of the transmitting device are executable by the processor to cause the apparatus to:

identify, based at least in part on the sequence, at least a portion of coordinates associated with the physical location of the transmitting device.

20. The apparatus of claim 19, wherein the instructions are further executable by the processor to cause the apparatus to:

identify least significant bits (LSBs) of the coordinates based at least in part on the time-frequency resource, wherein the portion of the coordinates comprises the LSBs of the coordinates.

21. An apparatus for wireless communication at a transmitting device, comprising:

means for identifying location coordinates corresponding to a physical location of the transmitting device;

means for identifying a time-frequency resource within a slot, the time-frequency resource corresponding to at least a portion of the location coordinates corresponding to the physical location of the transmitting device;

means for generating a sequence based at least in part on the portion of the location coordinates, or the slot, or the time-frequency resource, or a combination thereof;

means for encoding a signal using the sequence; and means for transmitting the signal using the identified time-frequency resource to indicate the physical location of the transmitting device.

22. The apparatus of claim 21, further comprising:

means for determining that the physical location of the transmitting device lies within a location area of a set of available location areas, wherein the sequence is based at least in part on the location area.

23. The apparatus of claim 22, wherein each location area within the set of available location areas comprises a grid of geographic areas, each geographic area corresponding to a time-frequency resource within a set of available time-frequency resources.

24. The apparatus of claim 21, further comprising:

means for retrieving information identifying the location coordinates from a global positioning system of the transmitting device.

25. The apparatus of claim 21, further comprising:

means for identifying least significant bits (LSBs) of the location coordinates.

26. An apparatus for wireless communication at a receiving device, comprising:

means for receiving a signal from a transmitting device over a time-frequency resource within a slot;

means for attempting to decode the signal using a set of available sequences, each sequence in the set of available sequences associated with the time-frequency resource and the slot;

means for identifying a sequence from the set of available sequences based at least in part on successfully decoding the signal using the sequence; and means for determining a physical location of the transmitting device based at least in part on the time-frequency resource, or the slot, or the sequence, or a combination thereof.

27. The apparatus of claim 26, further comprising:

means for determining that the physical location of the transmitting device lies within a location area of a set of available location areas, wherein the sequence is based at least in part on the location area.

28. The apparatus of claim 27, wherein each location area within the set of available location areas comprises a grid of geographic areas, each geographic area corresponding to a time-frequency resource within a set of available time-frequency resources.

29. The apparatus of claim 26, wherein the means for determining the physical location of the transmitting device comprises:

means for identifying, based at least in part on the sequence, at least a portion of coordinates associated with the physical location of the transmitting device.

30. The apparatus of claim 29, further comprising:

means for identifying least significant bits (LSBs) of the coordinates based at least in part on the time-frequency resource, wherein the portion of the coordinates comprises the LSBs of the coordinates.

31. A non-transitory computer-readable medium storing code for wireless communication at a transmitting device, the code comprising instructions executable by a processor to:

identify location coordinates corresponding to a physical location of the transmitting device;

identify a time-frequency resource within a slot, the time-frequency resource corresponding to at least a portion of the location coordinates corresponding to the physical location of the transmitting device;

generate a sequence based at least in part on the portion of the location coordinates, or the slot, or the time-frequency resource, or a combination thereof;

encode a signal using the sequence; and transmit the signal using the identified time-frequency resource to indicate the physical location of the transmitting device.

32. A non-transitory computer-readable medium storing code for wireless communication at a receiving device, the code comprising instructions executable by a processor to:

receive a signal from a transmitting device over a time-frequency resource within a slot;

attempt to decode the signal using a set of available sequences, each sequence in the set of available sequences associated with the time-frequency resource and the slot;

identify a sequence from the set of available sequences based at least in part on successfully decoding the signal using the sequence; and determine a physical location of the transmitting device based at least in part on the time-frequency resource, or the slot, or the sequence, or a combination thereof.

* * * * *